US011843869B2

(12) United States Patent
Morita

(10) Patent No.: US 11,843,869 B2
(45) Date of Patent: Dec. 12, 2023

(54) IMAGE PICKUP APPARATUS CAPABLE OF EXECUTING EMISSION PHOTOGRAPHING AND CONTROL METHOD THEREFOR

(71) Applicant: CANON KABUSHIKI KAISHA, Tokyo (JP)

(72) Inventor: Takuro Morita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/742,032

(22) Filed: May 11, 2022

(65) Prior Publication Data

US 2022/0377225 A1   Nov. 24, 2022

(30) Foreign Application Priority Data

May 21, 2021   (JP) ................................. 2021-086107

(51) Int. Cl.
*H04N 23/74*    (2023.01)
(52) U.S. Cl.
CPC .................................. *H04N 23/74* (2023.01)
(58) Field of Classification Search
CPC .... H04N 23/74; H04N 23/667; H04N 23/663; G03B 15/02
USPC ...................................................... 348/222.1
See application file for complete search history.

(56) References Cited

U.S. PATENT DOCUMENTS

| 2010/0123821 | A1* | 5/2010 | Gwak | H04N 23/667 348/E5.038 |
| 2010/0232778 | A1* | 9/2010 | Gwak | G03B 15/03 396/157 |
| 2016/0021286 | A1* | 1/2016 | Shintani | G03B 9/08 348/370 |

FOREIGN PATENT DOCUMENTS

| JP | 2015126386 | * 12/2013 |
| JP | 2015-126386 A | 7/2015 |
| JP | 2019-079024 A | 5/2019 |

* cited by examiner

*Primary Examiner* — Lin Ye
*Assistant Examiner* — Chan T Nguyen
(74) *Attorney, Agent, or Firm* — CANON U.S.A., INC. IP Division

(57) ABSTRACT

An apparatus that is capable of displaying a good live view image even during continuous emission photographing. The apparatus includes a sensor, a memory device that stores a set of instructions, and at least one processor that executes the set of instructions to obtain a display image cyclically using the sensor, and obtain a flash control image accompanied with a pre-emission of a first flash unit using the sensor at a non-accumulation timing at which the sensor does not perform charge accumulation for cyclic obtainment of the display image.

17 Claims, 17 Drawing Sheets

FIG. 5

| COMMAND | NUMBER OF DATA | MEANING |
| --- | --- | --- |
| 10H | 2 | EMISSION MODE INFORMATION REQUEST |
| 12H | 2 | EMISSION MODE SETTING |
| 14H | 2 | CHARGE COMPLETION CONFIRMATION |
| 16H | 2 | EMISSION PERMISSION NOTIFICATION |
| 18H | 2 | WIRELESS EMISSION TIMING SETTING |

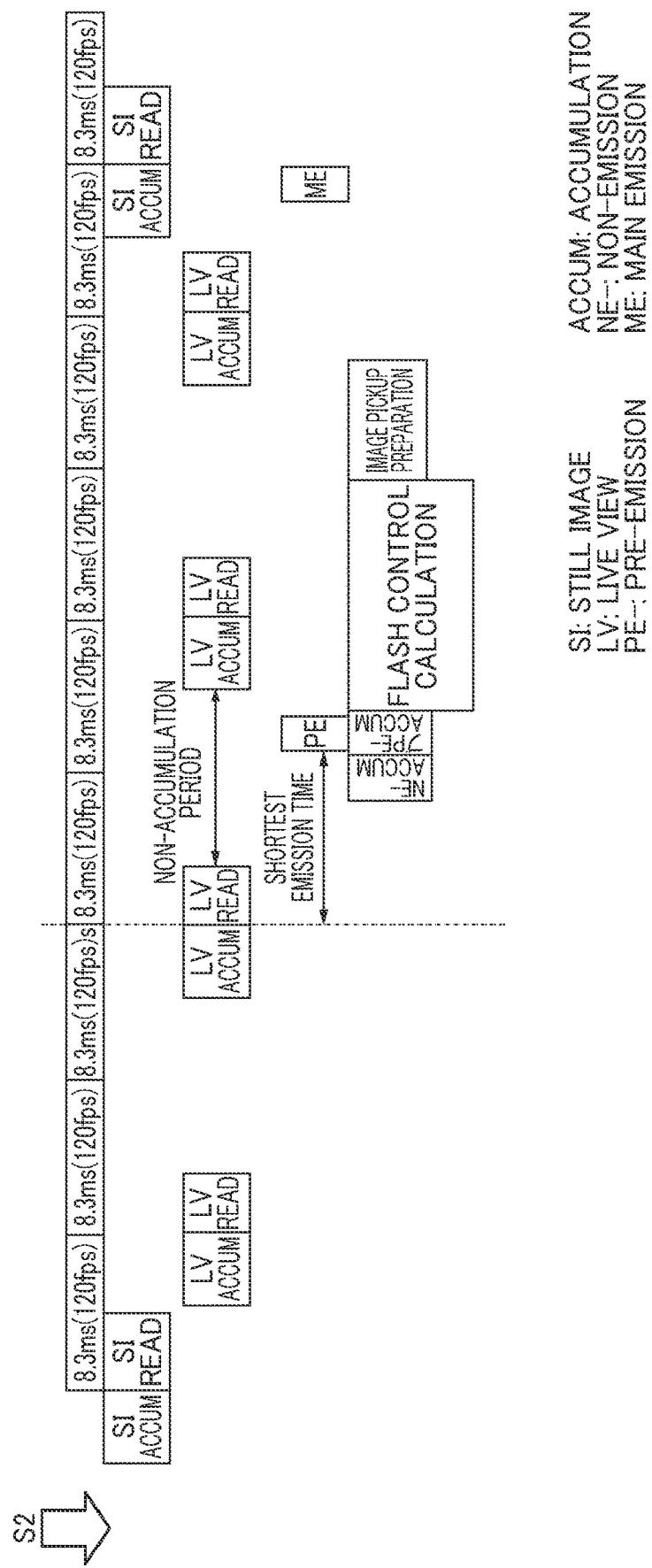

IMAGE PICKUP APPARATUS CAPABLE OF EXECUTING EMISSION PHOTOGRAPHING AND CONTROL METHOD THEREFOR

BACKGROUND

Technical Field

The aspect of the embodiments relates to an image pickup apparatus capable of executing emission photographing and a control method therefor.

Description of the Related Art

Among image pickup apparatuses, there is a known image pickup apparatus that is capable of executing what is called emission photographing that pikes up an image with an image sensor in an apparatus body while controlling a light emitting member of a flash unit attached to the apparatus body to emit light. Japanese Laid-Open Patent Publication (Kokai) No. 2019-79024 (JP 2019-79024A, Counterpart of U.S. Pat. No. 10,602,051) discloses continuous photographing (continuous shooting). In such an image pickup apparatus, an image sensor may be used to obtain a recording image of emission photographing cyclically and to cyclically obtain a display image as a live view image during the photographing.

Incidentally, when continuous emission photographing is executed, light from a light emitting member of a flash unit may affect a display image so as to fluctuate image quality. Particularly, when the light emitting member of the flash unit performs pre-emission for flash control of each emission photographing, a possibility that the light of the pre-emission fluctuates the image quality of the display image becomes higher. In view of the issue, Japanese Laid-Open Patent Publication (Kokai) No. 2015-126386 (JP 2015-126386A) discloses a technique that switches a drive mode of an image sensor when pre-emission is performed in each photographing in continuous emission photographing. Then, in this publication, a cycle of obtaining a display image in the continuous emission photographing is lengthened, and pre-emission of a light emitting member of a flash unit is performed during a non-accumulation period in a long obtaining cycle. Thereby, the light of the pre-emission becomes hard to fluctuate image quality of a display image.

However, when the cycle of obtaining the display image during photographing is lengthened by switching the drive mode of the image sensor, an update period of a live view image also becomes long, which lowers convenience of a live view image. A live view image in the continuous emission photographing becomes difficult to display an image pickup state of the image pickup apparatus in real time. In the continuous emission photographing, suitable determination of an image pickup area etc. based on a live view image in the continuous emission photographing becomes difficult.

Particularly, when light emitting members of a plurality of flash units emit light in each emission photographing, at least one flash unit is to perform an optical pulse communication or a wireless communication with an apparatus body of an image pickup apparatus. When the light emitting member of such a flash unit that communicates with the apparatus body of the image pickup apparatus performs pre-emission, the cycle of obtaining the display image during photographing may be lengthened by considering communication time.

SUMMARY

According to embodiments of the disclosure, an apparatus includes a sensor, a memory device that stores a set of instructions, and at least one processor that executes the set of instructions to obtain a display image cyclically using the sensor, and obtain a flash control image accompanied with a pre-emission of a first flash unit using the sensor at a non-accumulation timing at which the sensor does not perform charge accumulation for cyclic obtainment of the display image.

Further features will become apparent from the following description of exemplary embodiments with reference to the attached drawings.

BRIEF DESCRIPTION OF THE DRAWINGS

FIG. 5 is an explanatory view showing communication commands that are transmitted from the apparatus body to the flash unit.

FIG. 11A, FIG. 11B, and FIG. 11C are timing charts showing the image pickup process of the flowchart in FIG. 10 in the case where the external flash unit performs pre-emission for flash control for the continuous flash photographing.

DESCRIPTION OF THE EMBODIMENTS

Figure 1:
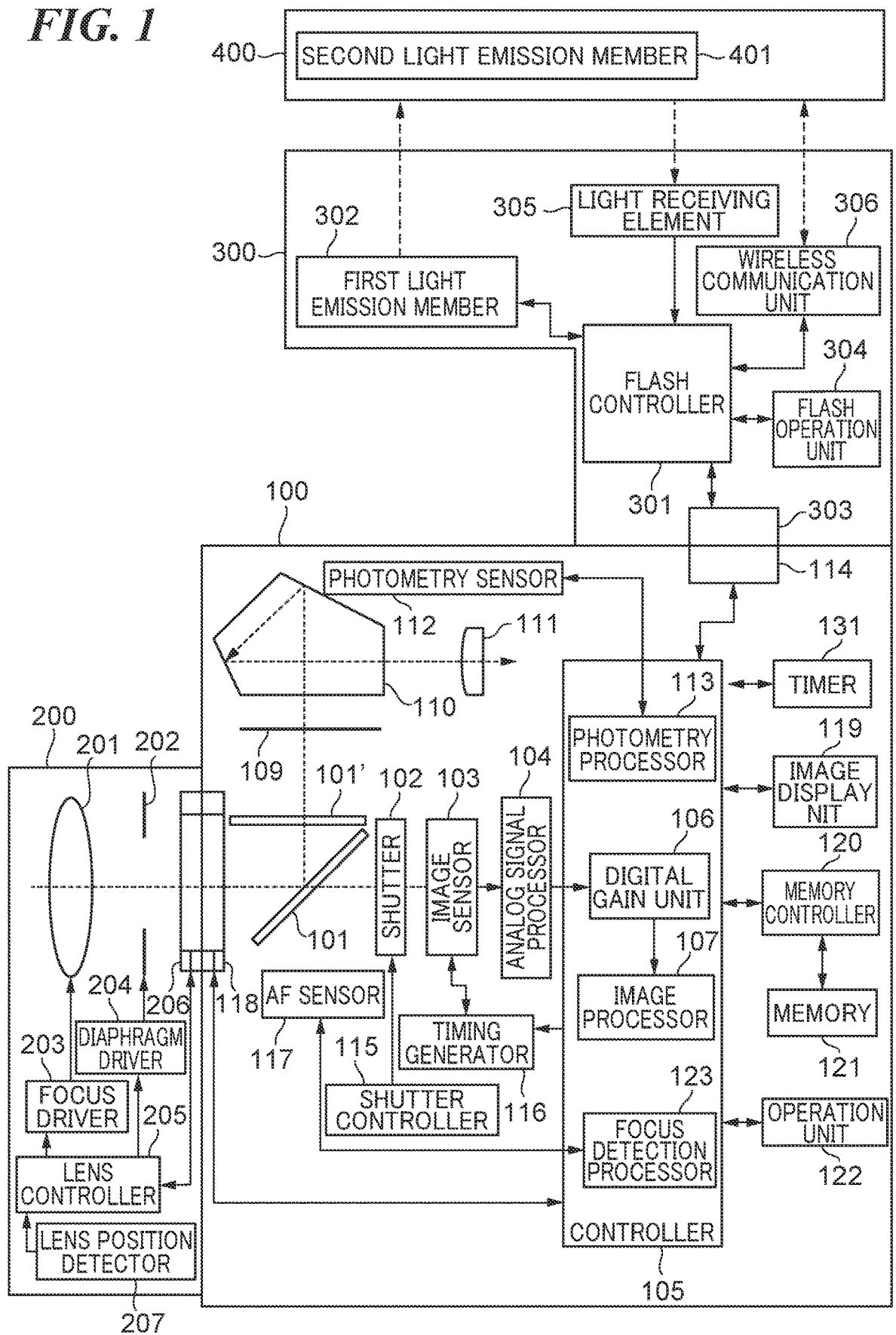
FIG. 1 is a block diagram schematically showing a configuration of an image pickup apparatus according to an embodiment of the disclosure.

Hereafter, some exemplary embodiments according to the disclosure will be described in detail by referring to the drawings. However, a configuration described in the following embodiments is just an example, and the scope of the disclosure is not limited to the configuration described in the embodiments.

FIG. 1 is a block diagram schematically showing an image pickup apparatus 1 according to the embodiment of the disclosure. The image pickup apparatus 1 in FIG. 1 has an apparatus body 100, a lens unit 200 attached to the apparatus body 100, and a first flash unit 300 attached to the apparatus body 100. Moreover, FIG. 1 shows a second flash unit 400 that is communicable with the first flash unit 300 through optical pulse communication or wireless communication.

The lens unit 200, which is exchangeable, is attached to the apparatus body 100. The lens unit 200 has a lens 201, diaphragm 202, focus driver 203, diaphragm driver 204, lens position detector 207, and lens controller 205. The lens 201 includes lens groups, such as a focusing lens and a zoom lens. The lens 201 takes in light entering from an object into the apparatus body 100.

The focus driver 203 drives the focusing lens to change its position. Thereby, the lens 201 can focus on an object that is apart from the image pickup apparatus 1. The diaphragm 202 adjusts an amount of passing light depending on a size of an opening. The diaphragm driver 204 drives the diaphragm 202 to control its opening.

The lens position detector 207 obtains a zoom position (focal length information) of the lens 201 and information about a distance to a focal plane on the basis of position information about the lens 201. The lens controller 205 communicates with a controller 105 of the apparatus body 100 through connectors 206 and 118 for the lens and controls each part included in the lens unit 200. The lens controller 205 controls the position of the focusing lens through the focus driver 203, adjusts the opening of the diaphragm 202 through the diaphragm driver 204, and adjusts the light amount during photographing.

The apparatus body 100 has an image sensor 103, a main mirror 101 arranged in an optical path toward the image sensor 103, and a shutter 102 as optical members. The image sensor 103 is a CMOS sensor or a CCD sensor, for example. The main mirror 101 is arranged diagonally to the optical path so as to divide a part of a light beam, which travels from the lens unit 200 toward the image sensor 103, to a finder (not shown).

The light from the object divided by the main mirror 101 is guided to the finder through a focusing screen 109, a pentagonal prism 110, and an eyepiece lens 111. The focusing screen 109 is arranged at a primary image plane of the lens unit 200. A Fresnel lens (condenser lens) is provided in an incident surface of the focusing screen 109. An optical image (finder image) of the object is formed in an exit surface of the focusing screen 109.

The pentagonal prism 110 reflects the light entering into a finder optical path by multiple times so as to convert the object image formed in the exit surface of the focusing screen 109 into an erected normal image. The eyepiece lens 111 is configured so that a diopter can be adjusted according to a user's eyesight when a user looks in at the finder. Moreover, the main mirror 101 rotates according to an operating state of the image pickup apparatus 1. When the user observes an object through the finder, the main mirror 101 is arranged diagonally to the optical path toward the image sensor 103. The main mirror 101 is retracted from the optical path toward the image sensor 103 at a time of photographing. Thereby, the light beam from the lens unit 200 is guided to the image sensor 103.

It should be noted that the image pickup apparatus 1 may employ what is called a mirrorless configuration that does not have the main mirror 101 or a lens-integrated configuration of which the lens unit 200 is not exchangeable. Although the mirrorless configuration and the lens-integrated configuration are different from the configuration shown in FIG. 1, detailed descriptions are omitted because they can be achieved by employing well-known configurations.

The shutter 102 is provided between the main mirror 101 and the image sensor 103. In a period when the shutter 102, which usually closes, opens, the light beam from the lens unit 200 enters into the image sensor 103.

The apparatus body 100 has an image pickup control system that includes an analog signal processor 104, a timing generator 116, a shutter controller 115, a timer 131, an image display unit 119, a memory controller 120, an operation unit 122, and the controller 105 to which these are connected. In addition, a photometry sensor 112, an AF sensor 117, a connector 114 for the flash, and the connector 118 for the lens are connected to the controller 105. The controller 105 is a microcomputer that has a CPU, ROM, and RAM, for example. The microcomputer reads and runs a program recorded in the ROM. Thereby, the microcomputer achieves the controller 105 that controls an operation of each part of the image pickup apparatus 1.

Specifically, the controller 105 of the image pickup apparatus 1 achieves functions, such as a photometry processor 113, a digital gain unit 106, an image processor 107, and a focus detection processor 123. The photometry sensor 112 has a plurality of photodiodes corresponding to a plurality of areas that divide an image pickup area. The photometry sensor 112 detects a luminance of an object image formed on the exit surface of the focusing screen 109 with the photodiodes and outputs it to the photometry processor 113 of the controller 105. The photometry processor 113 executes a photometry process to pick up the object image satisfactorily on the basis of the detection output of the photometry sensor 112.

The AF sensor 117 outputs a defocus amount to the focus detection processor 123 of the controller 105. The focus detection processor 123 determines a drive amount of the lens 201 on the basis of the defocus amount from the AF sensor 117 so as to focus the lens 201 on the object and drives the lens unit 200 through the connector 118. The controller 105 controls the timing generator 116 and the shutter controller 115.

The timing generator 116 outputs image pickup timings to the image sensor 103. The image pickup timings of the image sensor 103 include an image pickup timing for obtaining a live view image, an image pickup timing for obtaining an image for flash control, etc. in addition to an image pickup timing for recording. The shutter controller 115 drives the shutter 102 to open and close.

The image sensor 103 is driven according to a timing signal output from the timing generator 116 and accumulates electric charges that are generated by receiving light from an object with a plurality of photoelectric conversion elements during a period when the shutter 102 opens. Then, the image sensor 103 outputs analog signals about a picked-up object image that is given by a light amount distribution corresponding to the electric charges accumulated in the photoelectric conversion elements.

The analog signal processor 104 samples and holds the analog signals output from the image sensor 103, adds analog gain, and converts them into digital signals by A/D conversion. The analog signal processor 104 outputs the digital signals about the picked-up object image to the controller 105. In the controller 105, the digital gain unit 106 adds the digital gain to the digital signals.

The image processor 107 executes digital signal processes, such as a pixel interpolation process and a color conversion process. The image processor 107 records data of the picked-up object image that has been subjected to the digital signal processes into the memory 121 through the memory controller 120. The image display unit 119 is an LCD monitor that is provided in the back surface of the apparatus body 100 of the image pickup apparatus 1. The image display unit 119 displays a live view image picked up cyclically by the image sensor 103.

The first flash unit 300 is detachably attached to the apparatus body 100. The first flash unit 300 has a flash controller 301. A first light emission member 302, a flash connector 303, a flash operation unit 304, a light receiving element 305, and a wireless communication unit 306 are connected to the flash controller 301. The first light emission member 302 emits light under control of the flash controller 301. The first light emission member 302 irradiates an object with flash light and emits an optical pulse for optical pulse communication with another flash unit like the second flash unit 400.

The second flash unit 400 is configured to be similar to the first flash unit 300. The second flash unit 400 has a second light emission member 401. The light receiving element 305 receives an optical pulse from another flash unit, when the first flash unit executes the optical pulse communication with the other flash unit.

The wireless communication unit 306 executes wireless communication with another flash unit. The flash operation unit 304 is an input unit that receives an operation from a user. The flash operation unit 304 has various kinds of operation buttons like a setting change button for an emission mode. The flash controller 301 controls the first light emission member 302 to emit light on the basis of a user's operation and a signal from the apparatus body 100 through the flash connector 303. The flash controller 301 executes data communication with another flash unit by the optical pulse communication using the first light emission member 302 and light receiving element 305 or the wireless communication using the wireless communication unit 306.

In the apparatus body 100, the timer 131 measures time and a period. The operation unit 122 has a touch panel, switches, and buttons that are operated by a user. The controller 105 controls an operation of each part of the image pickup apparatus 1 when an image pickup operation is performed to the operation unit 122. For example, the controller 105 sets up a cyclical image pickup timing to the timing generator 116 and shutter controller 115 to control the image sensor 103 so as to pick up a live view image cyclically.

The controller 105 sets up a single image pickup timing or continuous image pickup timings to the timing generator 116 and shutter controller 115 to control the image sensor 103 so as to execute flash photographing (pre-emission) for flash control. The controller 105 calculates a light amount of a main emission, etc. on the basis of the result of the pre-emission. For example, the controller 105 can pick up an image by the image sensor 103 in a state where the first light emission member 302 of the first flash unit 300 emits light.

The controller 105 sets up a single image pickup timing or continuous image pickup timings to the timing generator 116 and shutter controller 115 to control the image sensor 103 so as to pick up an image of an object for recording. The controller 105 records a picked-up object image into the memory 121.

Figure 2A:
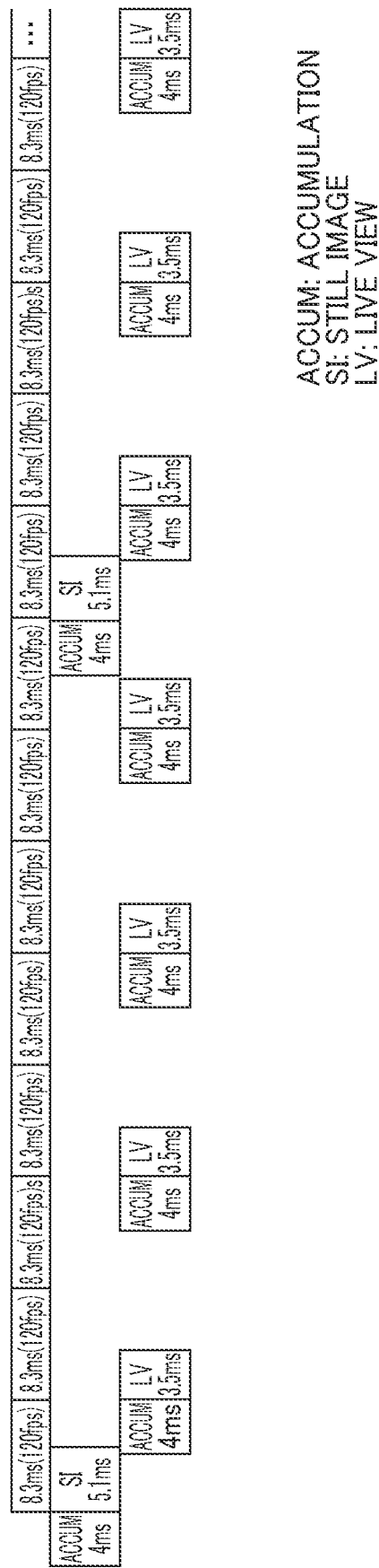
FIG. 2A and FIG. 2B are timing charts showing image pickup operations for live view in the image pickup apparatus in FIG. 1.
Figure 2B:
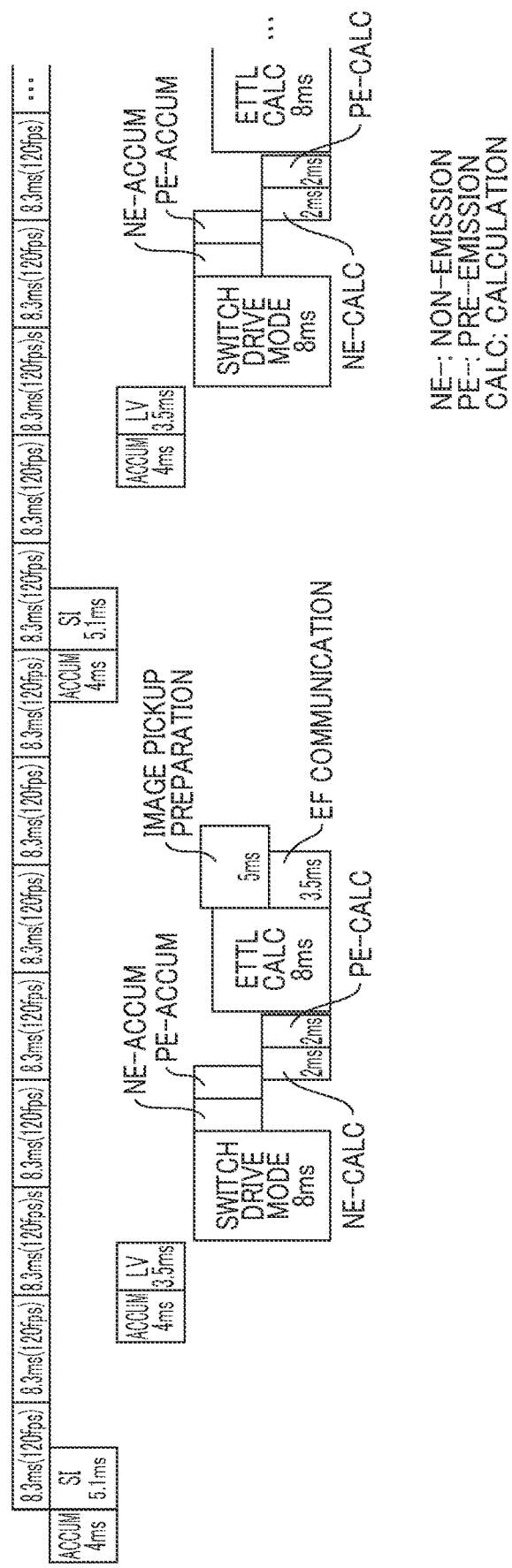

FIG. 2A and FIG. 2B are timing charts showing image pickup operations for live view in the image pickup apparatus in FIG. 1. FIG. 2A is a timing chart showing the image pickup operation of the image sensor 103 in a case where a live view image is picked up cyclically and continuation non-emission photographing for recording is executed. Time flows from left toward right. The image sensor 103 repeatedly picks up a live view image at a cycle of 60 fps after executing the first photographing for recording at the beginning. After that, the image sensor 103 repeatedly picks up a live view image at the cycle of 60 fps after executing the second photographing for recording. Although the image sensor 103 can execute the image pickup operation at a cycle of 120 fps at the maximum, a live view image is picked up at the certain cycle of 60 fps through the whole period.

In FIG. 2A, "ACCUM" shows an accumulation period of an electric charge of the image sensor 103. Moreover, "SI" shows a period used to read the electric charge accumulated in the image sensor 103 in order to generate a recording image (static image), and "LV" shows a period used to read the electric charge accumulated in the image sensor 103 in order to generate a live view image.

FIG. 2B is a timing chart showing the image pickup operation of the image sensor 103 in a case where a live view image is picked up cyclically and continuation emission photographing for recording is executed. Hereinafter, the emission photographing is also referred to as flash photographing. Time flows from left toward right. The image sensor 103 tries to repeatedly pick up a live view image at the cycle of 60 fps after executing the first flash photographing for recording at the beginning.

However, actually, a drive mode of the image sensor 103 is switched to continuous flash photographing after the first live view image is picked up, and the flash photographing (pre-emission) for the flash control is executed corresponding to flash photographing (main emission). In the pre-emission in FIG. 2B, charge accumulation (NE-ACCUM) in a non-emission state and charge accumulation (PE-ACCUM) in a pre-emission state are executed. In this case, the controller 105, which controls the image sensor 103, executes a photometry calculation process (NE-CALC) based on the NE-ACCUM, a photometry calculation process (PE-CALC) based on the PE-ACCUM, and a flash control calculation process (ETTL-CALC) after the NE-ACCUM and PE-ACCUM for the pre-emission.

Moreover, the controller 105 sets the emission amounts etc. that are obtained by the calculations for the flash control to the first flash unit 300 or the second flash unit 400 by EF communication. After that, the image sensor 103 picks up an image with the main emission without resuming repeated photographing of a live view image. Then, the image sensor 103 picks up a live view image after the photographing with the pre-emission and the photographing with the main emission.

In this case, a live view image is picked up at a cycle longer than 60 fps. Moreover, no live view image is picked up during the period after switching the drive mode of the image sensor 103 until finishing the pre-emission and main emission. Since the live view image is not updated in real time at the short cycle of 60 fps, it is difficult for a user to check the current image pickup area etc. easily on the basis of the live view image.

Moreover, if a live view image should be picked up during the period between the switching of the drive mode of the image sensor 103 and the finish of the pre-emission and main emission, the light of the pre-emission may fluctuate the image quality of the live view image. When the image quality of the live view image varies, it will become difficult for the user to check the current image pickup area etc. using the live view image. In this way, the image pickup apparatus 1 is used to improve the live view image in the continuous flash photographing. The periods shown in the processes in FIG. 2A and FIG. 2B are examples, and are not limited to these examples.

Figure 3:
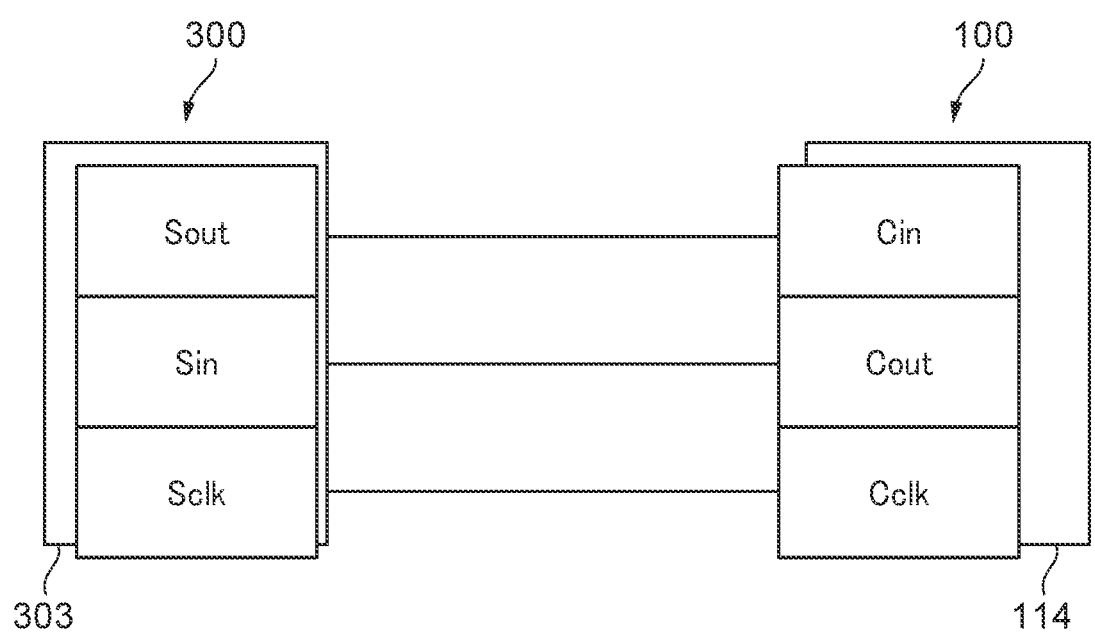
FIG. 3 is an explanatory view showing a connection state between an apparatus body and a flash unit in the image pickup apparatus in FIG. 1.

FIG. 3 is an explanatory view showing a connection state between the apparatus body 100 and the first flash unit 300 in the image pickup apparatus 1 in FIG. 1. The apparatus body 100 and the first flash unit 300 of the image pickup apparatus 1 are connected through the connector 114 for the flash and the flash connector 303. The connector 114 for the flash of the apparatus body 100 has a Cin terminal, a Cout terminal, and a Cclk terminal. The flash connector 303 of the first flash unit 300 has an Sout terminal, Sin terminal, and Sclk terminal. The Cin terminal and the Sout terminal are connected. The Cout terminal and the Sin terminal are connected. The Cclk terminal and the Sclk terminal are connected.

The apparatus body 100 and the first flash unit 300 communicate using a clock synchronization signal. The apparatus body 100 outputs a data modulation signal from the Cout terminal, and the first flash unit 300 outputs a data modulation signal from the Sout terminal. The apparatus body 100 samples the data modulation signal input into the Cin terminal in synchronization with a clock synchronization signal and demodulates output data from the first flash unit 300. The first flash unit 300 samples the data modulation signal input into the Sin terminal in synchronization with the clock synchronization signal and demodulates output data from the apparatus body 100.

Figure 4:
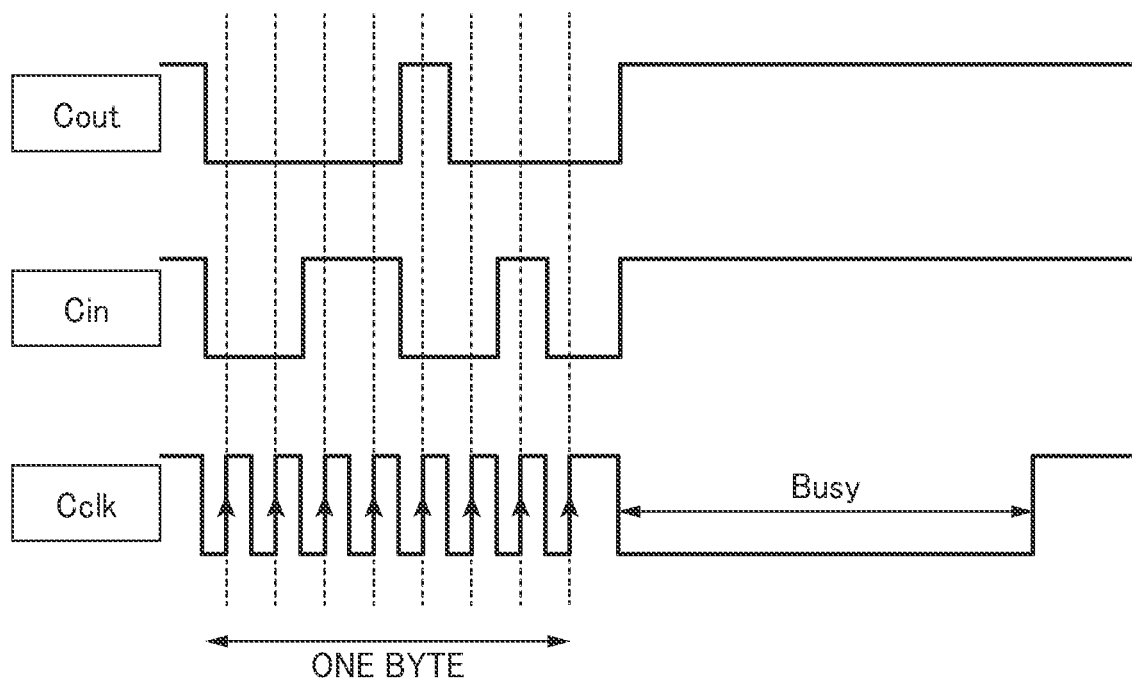
FIG. 4 is a timing chart showing communications between the apparatus body and the flash unit in FIG. 3.

FIG. 4 is a timing chart showing communications between the apparatus body 100 and the flash unit in FIG. 3. An upper chart in FIG. 4 shows a signal waveform of the data modulation signal that the apparatus body 100 outputs from the Cout terminal. A middle chart in FIG. 4 shows a signal waveform of the data modulation signal that is output from the flash unit and is input to the Cin terminal. A lower chart in FIG. 4 shows a waveform of the clock synchronization signal output from the Cclk terminal.

The apparatus body 100 samples the signal input to the Cin terminal at a rise timing of the clock synchronization signal and obtains one byte of data. In this example, the first flash unit 300 outputs the data "32HEX" to the apparatus body 100. The flash unit samples the signal output from the Cout terminal at the rise timing of the clock synchronization signal and obtains one byte of data. Moreover, after obtaining the data, the apparatus body 100 may stop outputting the clock synchronization signal to the Cclk terminal to go into a busy state. Thereby, the apparatus body 100 and the flash unit can execute the process based on the obtained data. When a predetermined process has been executed in the busy state where the Cclk terminal is kept in a low level, the apparatus body 100 may switch the Cclk terminal to a high level.

FIG. 5 is an explanatory view showing communication commands that are transmitted from the apparatus body 100 to the flash unit. The apparatus body 100 can transmit a plurality of kinds of communication commands shown in FIG. 5 to the first flash unit 300. The number of data that the first flash unit 300 outputs to the apparatus body 100 in response to a communication command is beforehand determined for every command. Then, when the apparatus body 100 outputs the communication command 10H to the first flash unit 300, the first flash unit 300 recognizes it as "emission mode information request" communication. The first flash unit 300 outputs emission mode information to the apparatus body 100 by the data communication of the second byte.

In addition, when the apparatus body 100 outputs the communication command 12H to the first flash unit 300, the first flash unit 300 recognizes it as "emission mode setting" communication for changing an emission mode. Moreover, the apparatus body 100 outputs information about the desired emission mode to the first flash unit 300 by the data communication of the second byte. The first flash unit 300 sets up and changes the emission mode.

Figure 6:
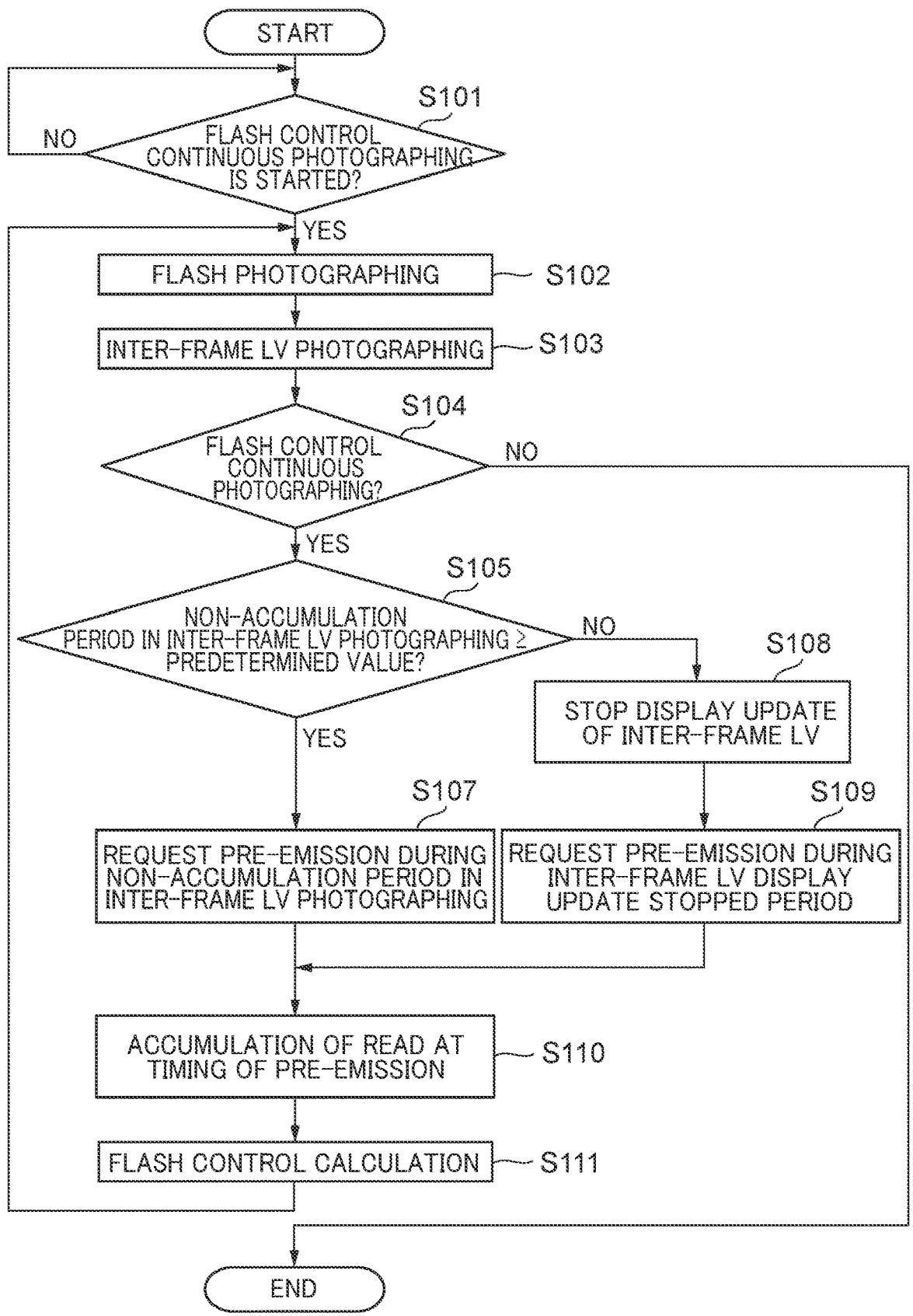
FIG. 6 is a flowchart showing an image pick-up process executed in the image pickup apparatus in FIG. 1 in a case where continuous flash photographing accompanied with pre-emission for flash control is executed.

FIG. 6 is a flowchart showing an image pickup process executed in the image pickup apparatus 1 in FIG. 1 in a case where continuous flash photographing accompanied with pre-emission for flash control is executed. The controller 105 of the image pickup apparatus 1 may execute the control in FIG. 6 when executing the continuous flash photographing accompanied with the pre-emission for flash control.

In a step S101, the controller 105 determines whether continuous photographing accompanied with flash control, which means the continuous flash photographing accompanied with the pre-emission for flash control, is started. When starting the continuous photographing accompanied with the flash control, a user gives a start operation to the operation unit 122. When the start operation of the continuous photographing accompanied with the flash control is not given to the operation unit 122, the controller 105 repeats this process. When the start operation of the continuous photographing accompanied with the flash control is given to the operation unit 122, the controller 105 proceeds with the process to a step S102.

In the step S102, when it is an image pickup timing with the main emission for recording, the controller 105 requests the main emission from the first flash unit 300 and executes flash photographing. The controller 105 controls accumulation and read of the image sensor 103. The image sensor 103 receives light including an emission component of the first flash unit 300 and accumulates corresponding electric charge in order to generate a picked-up image for recording. The controller 105 stores the picked-up image that is read and obtained from the image sensor 103 into the memory 121 to record it.

In a step S103, when it is an image pickup timing of a live view image, the controller 105 picks up a live view image during the continuous photographing accompanied with the flash control (inter-frame LV photographing). The controller 105 controls accumulation and read of the image sensor 103. The controller 105 outputs the picked-up image that is read and obtained from the image sensor 103 to the image display unit 119. The user can check the image pickup area that can be picked up by the image pickup apparatus 1 in real time.

Then, the controller 105 can repeat the recording process of the image of the flash photographing and the display process of the live view image by repeating a loop process including the steps S102 and S103. In continuous flash photographing, updating a live view image can be continued by a good cycle and frequency.

In a step S104, the controller 105 determines whether the continuous photographing accompanied with the flash control is continued. When finishing the continuous photographing accompanied with the flash control, the user gives a termination operation to the operation unit 122. When the termination operation of the continuous photographing accompanied with the flash control is not given to the operation unit 122, the controller 105 determines that the continuous photographing accompanied with the flash control is continued and proceeds with the process to a step S105. When the termination operation of the continuous photographing accompanied with the flash control is given to the operation unit 122, the controller 105 finishes this process.

In the step S105, the controller 105 determines whether a non-accumulation (blank) period in the inter-frame live view photographing until the next live view photographing is equal to or more than a predetermined value. On this occasion, the controller 105 may calculate the non-accumulation period by subtracting an accumulation period and a read period from the frame rate in the live view photographing started in the step S103. For example, when the accumulation period is 8.3 ms (millisecond) and the read period is 3.5 ms in the live view photographing of a slit rolling method of which the frame rate is 60 fps (cycle of 16.6 ms), the non-accumulation period becomes 4.8 ms (=16.6−(8.3+3.5)).

Moreover, the predetermined value for determining the blank period may be set on the basis of the pre-emission period for the flash control that is needed to perform the pre-emission of the first flash unit 300 for the flash control, for example. Then, when the non-accumulation (blank) period is equal to or more than the predetermined value, the controller 105 proceeds with the process to a step S107. When the non-accumulation (blank) period is less than the predetermined value, the controller 105 proceeds with the process to a step S108.

In the step S107, the controller 105 requests the pre-emission for the flash control from the first flash unit 300 in order to execute the pre-emission during the non-accumulation (blank) period. After that, the controller 105 proceeds with the process to a step S110.

When the non-accumulation (blank) period is less than the predetermined value, the controller 105 temporarily stops display update (the step S103) of the inter-frame live view image in the step S108. The controller 105 may temporarily stop the display update of the inter-frame live view image until the next flash photographing with the main emission finishes or until a period equivalent to the predetermined value for determining the blank period elapses. The controller 105 resumes the display update of the inter-frame live view image in the step S103 after a temporary stop period elapses.

In a step S109, the controller 105 requests the pre-emission for the flash control from the first flash unit 300 in order to execute the pre-emission during the temporary stop period in which the display update of the inter-frame live view image is temporarily stopped. In the step S110, the controller 105 executes the flash photographing as the pre-emission for the flash control of the first flash unit 300. The controller 105 controls accumulation and read of the image sensor 103. The image sensor 103 receives light including an emission component of the pre-emission and accumulates corresponding electric charge.

Figure 7A:
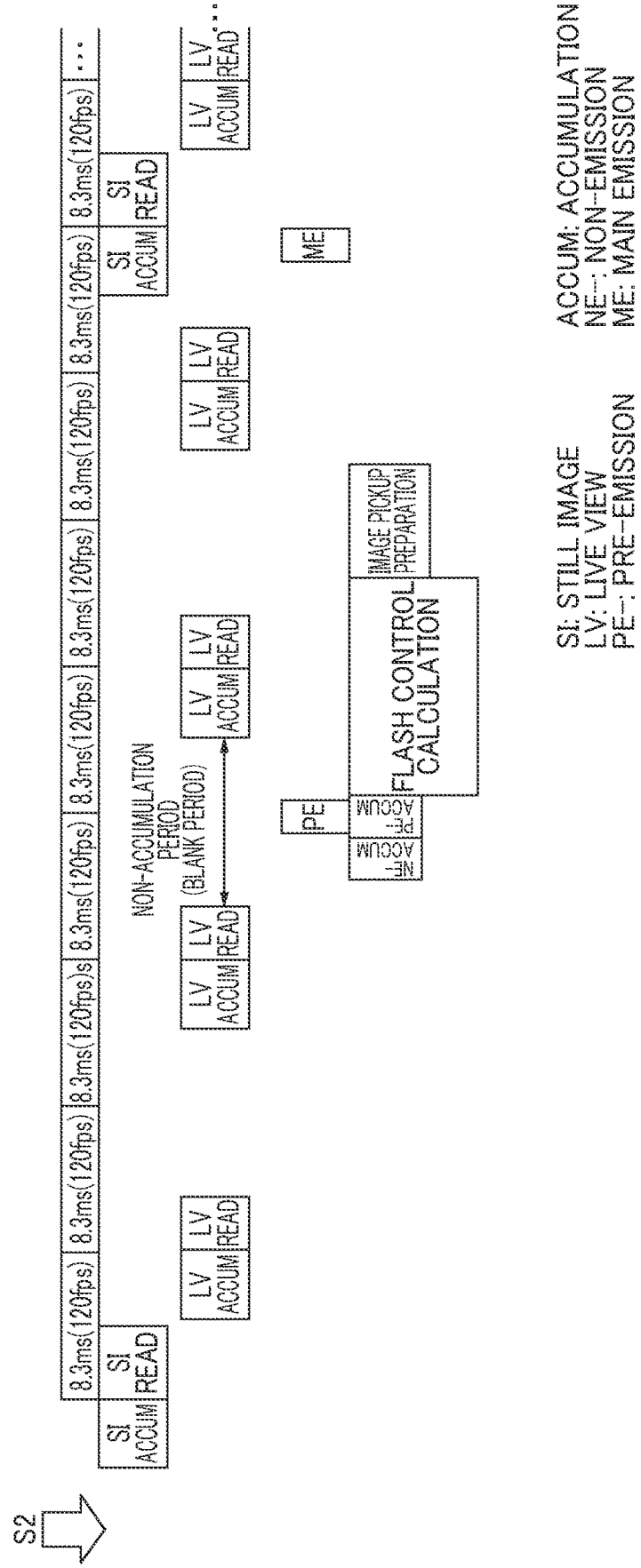
FIG. 7A and FIG. 7B are timing charts showing sequences of the image pickup process of the flowchart in FIG. 6.

The controller 105 reads and obtains the picked-up image from the image sensor 103. The sequence of the photographing in the case where the process in the step S107 is executed is shown in FIG. 7A mentioned later. The sequence of the photographing in the case where the processes in the steps S108 and S109 are executed is shown in FIG. 7B mentioned later.

In a step S111, the controller 105 calculates the emission amount for the main emission of the first flash unit 300 on the basis of the picked-up image at the time of the pre-emission obtained in the step S110. The controller 105 may calculate the emission amount of the main emission using the technique of the flash control calculation described in JP 2015-126386A mentioned above. Thereby, the controller 105 as a flash control calculation unit can calculate the emission amount of the main emission of the first flash unit 300 at the time of the continuous flash photographing on the basis of a flash control image. After that, the controller 105 returns the process to the step S102.

Figure 7B:
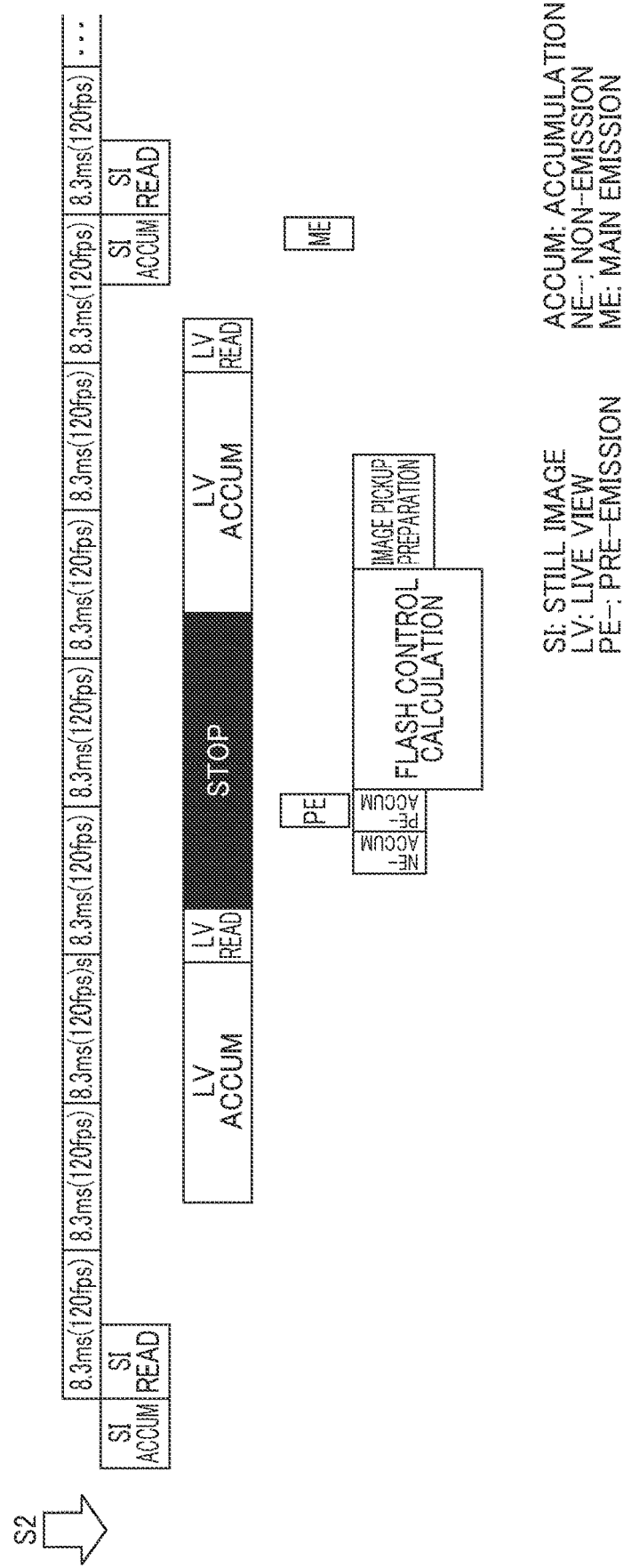

FIG. 7A and FIG. 7B are timing charts showing sequences of the image pickup process of the flowchart in FIG. 6. FIG. 7A shows the sequence of the image pickup process in the case where the process in the step S107 in FIG. 6 step S107 is executed. In the sequence of the image pickup process in FIG. 7A, the image sensor 103 repeats the flash photographing accompanied with the main emission of the first flash unit 300 at a predetermined cycle. Moreover, the image sensor 103 repeatedly picks up a live view image at the cycle of 60 fps suitable for update of a live view image without a lack.

Then, the image sensor 103 executes the photographing (pre-emission accumulation) accompanied with the pre-emission for the flash control about the first flash unit 300 during the non-accumulation (blank) period between the image pickup timings of two continuous live view images. In the meantime, the controller 105 executes the flash control calculation and the process (image pickup preparation) for setting the calculated emission amount of the main emission to the first flash unit 300 at the same timing at which the image sensor 103 picks up the next live view image.

FIG. 7B shows the sequence of the image pickup process in the case where the processes in the steps S108 and S109 in FIG. 6 are executed. Moreover, FIG. 7B shows the case where the accumulation period for picking up a live view image becomes long. In this case, if the photographing of a live view image should be tried at the cycle of 60 fps, the non-accumulation (blank) period between the image pickup timings of two continuous live view images becomes less than the predetermined value. In the sequence of the image pickup process in FIG. 7B, the image sensor 103 repeats the flash photographing accompanied with the main emission of the first flash unit 300 at a predetermined cycle. Moreover, the image sensor 103 tries to pick up a live view image at the cycle of 60 fps. However, the photographing of the live view image in the second pickup period is temporarily stopped in the process of the step S108. And a live view image in this time point is lacked.

Then, the image sensor 103 executes the photographing (pre-emission accumulation) accompanied with the pre-emission for the flash control about the first flash unit 300 during the period in which the photographing of a live view image is stopped. In the meantime, the controller 105 executes the flash control calculation and the process (image pickup preparation) for setting the calculated emission amount of the main emission to the first flash unit 300 at the same timing at which the image sensor 103 picks up the next live view image.

As mentioned above, since the controller 105 executes the pre-emission for the flash control during the period in which a live view image is not accumulated in the flash control continuous photographing, the live view image can be displayed at the update cycle equivalent to that of the non-emission continuous photographing. Moreover, when the accumulation period of the live view image becomes long and the pre-emission affects the live view image, the controller 105 stops the update of the live view image, performs the pre-emission for the flash control, and can display the live view image of which brightness is stabilized.

Then, the controller 105 can control the first flash unit 300 so as to perform the pre-emission at the timing at which the charge accumulation for obtaining a live view image cyclically is not performed. When the non-accumulation period between the cyclic charge accumulations of the image sensor 103 for the live view images is equal to or more than the accumulation period of the electric charge of the image sensor 103 for the flash control image, the controller 105 controls the first flash unit 300 so as to perform the pre-emission at the timing in the non-accumulation period.

Moreover, when the non-accumulation period between the cyclic charge accumulations of the image sensor 103 for the live view images is less than the accumulation period of the electric charge of the image sensor 103 for the flash control image, the controller 105 stops the cyclic obtainment of a live view image so as to thin out. Then, the controller 105 controls the first flash unit 300 so as to perform the pre-emission at a non-accumulation timing generated by thinning out. In this way, the controller 105 can perform the continuous flash photographing while minimizing the period during which the display update is stopped.

In this embodiment, the first image pickup controller cyclically obtains a live view image using the image sensor 103 in the image pickup apparatus 1 that can perform the continuous flash photographing by the image sensor 103 in the state where the first light emission member 302 is controlled to emit light. Thereby, the live view image that is used to determine the image pickup area of the image pickup apparatus 1 can be cyclically updated by using the live view image obtained cyclically.

In this embodiment, particularly the controller 105 obtains the flash control image accompanied with the pre-emission of the first light emission member 302 for the continuous flash photographing using the image sensor 103 as the process of the second image pickup controller other than the first image pickup controller that obtains a live view image. The controller 105 gives priority to the cyclic obtainment of the live view image by the first image pickup controller and controls the first light emission member 302 so as to perform the pre-emission at the timing at which the image sensor 103 does not perform the charge accumulation for the cyclic obtainment of the live view image.

Specifically, when the non-accumulation period between the cyclic charge accumulations of the image sensor 103 for the live view images is equal to or more than the accumulation period of the electric charge of the image sensor 103 for the flash control image, the controller 105 controls the first light emission member 302 so as to perform the pre-emission during the non-accumulation period.

Meanwhile, when the non-accumulation period between the cyclic charge accumulations of the image sensor 103 for the live view images is less than the accumulation period of the electric charge of the image sensor 103 for the flash control image, the controller 105 stops the cyclic obtainment of a live view image so as to thin out.

Then, the controller 105 controls the first flash unit 300 so as to perform the pre-emission at a non-accumulation timing generated by thinning out the cyclic obtainment of the live view image. Thereby, the controller 105 can update the live view image at the certain cycle as the first image pickup controller, which updates the live view image cyclically, without being influenced by the obtainment of the flash control image. In this embodiment, the update cycle of the live view image hardly becomes long even when the flash control image is obtained. And the obtainment of the flash control image can reduce continuous lacks of the live view images.

As a result, in this embodiment, the image pickup apparatus 1 can update the live view image at the short cycle suitable for the live view so as to reduce lacks, which enables the user to suitably determine an image pickup area on the basis of the live view image. Moreover, even if the first light emission member 302 performs the pre-emission, the live view image of the certain image quality that is not subject to the influence of the pre-emission is obtainable.

Figure 8:
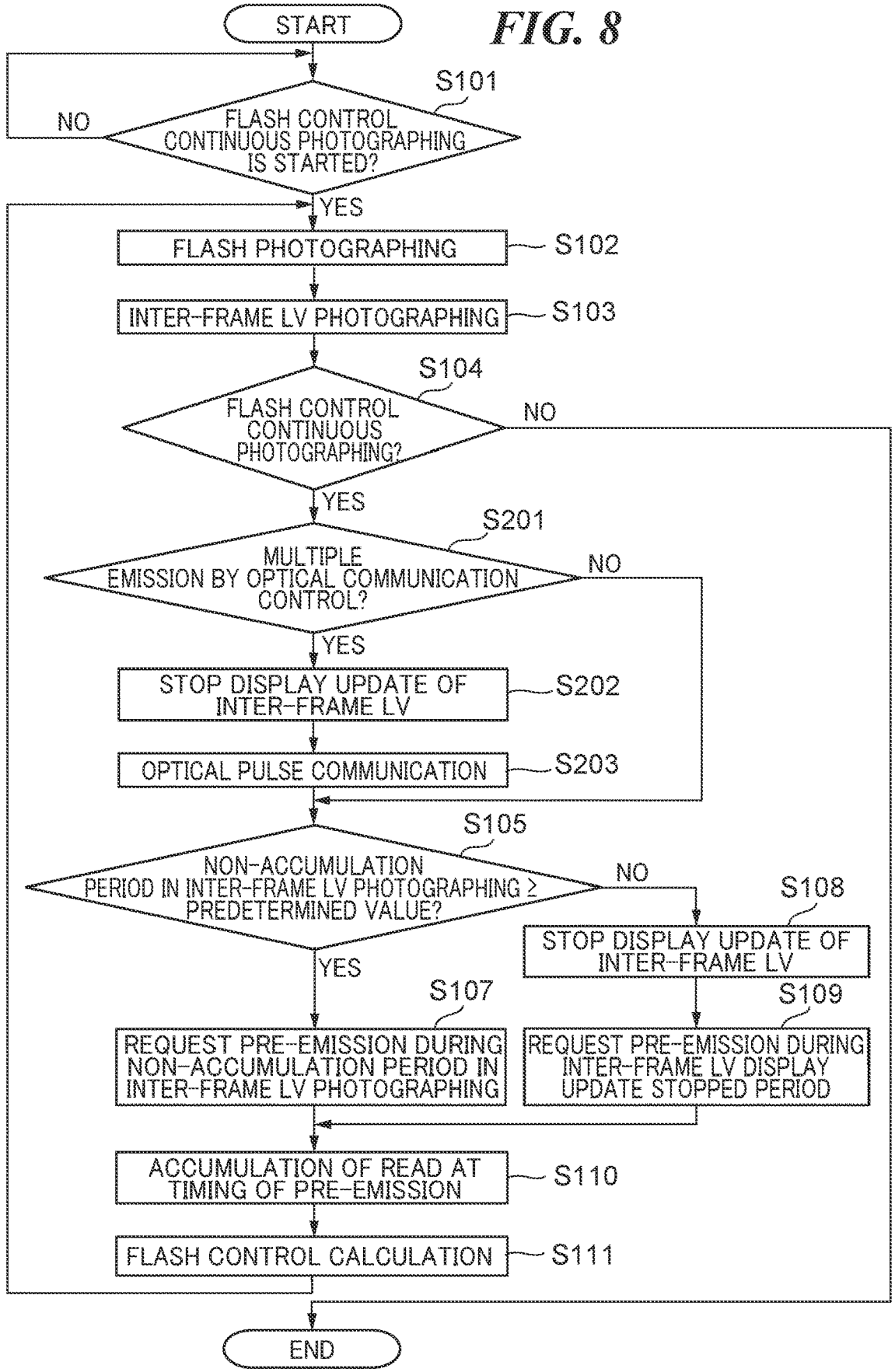
FIG. 8 is a flowchart showing an image pickup process executed in the image pickup apparatus in FIG. 1 in a case where a plurality of flash units execute optical pulse communication and perform pre-emission for flash control for the continuous flash photographing.

Next, an example that executes the continuous flash photographing accompanied with the optical pulse communication between a plurality of flash units and the pre-emissions for flash control will be described. FIG. 8 is a flowchart showing an image pickup process executed in the image pickup apparatus 1 in FIG. 1 in a case where a plurality of flash units execute optical pulse communication and perform pre-emissions for flash control for the continuous flash photographing. The first flash unit 300 and the second flash unit 400 in FIG. 1 have the light emission members 302 and 401 and the light receiving member 305, for example, in order to execute the optical pulse communication. It should be noted that only the light receiving element 305 of the first flash unit 300 is shown and a light receiving element of the second flash unit 400 is omitted in FIG. 1.

The controller 105 of the image pickup apparatus 1 may execute the process in FIG. 8 when a plurality of flash units execute the optical pulse communication and the continuous flash photographing accompanied with pre-emission for flash control is executed. The steps S101 through S111 are the same as that in FIG. 6, and their descriptions are omitted. When executing the process in the step S104, the controller 105 proceeds with the process to a step S201.

In the step S201, the controller 105 determines whether a multiple emission that performs the main emissions of a plurality of flash units by the optical communication control is executed. For example, when the light amount of the main emission of only the first flash unit 300 is insufficient, the controller 105 determines that the multiple emission, which performs the main emissions by the first flash unit 300 and the second flash unit 400, is executed, and proceeds with the process to the step S202. When determining that the multiple emission by the optical communication control is not executed, the controller 105 proceeds with the process to the step S105 as with the process in FIG. 6 in order to execute the photographing for the recording accompanied with the main emission of only the first flash unit 300.

In the step S202, the controller 105 temporarily stops the display update of the inter-frame live view image executed in the step S102 for the optical pulse communication. The controller 105 temporarily stops the display update of the inter-frame live view image until the execution of the optical pulse communication between the first flash unit 300 and the second flash unit 400 is finished. When inter-flash communication by the optical pulse is performed, the optical pulse may affect the image quality of the live view image. In the embodiment, since the display update of the inter-frame live view image is temporarily stopped, the optical pulse does not affect the live view image displayed.

The controller 105 resumes the display update of the inter-frame live view image in the step S103 after a temporary stop period elapses. In a step S203, the controller 105 executes the optical pulse communication between the first flash unit 300 and the second flash unit 400 while stopping the display update of the inter-frame live view image temporarily.

In the optical pulse communication, the controller 105 controls the first light emission member 302 to emit optical pulses at a predetermined cycle and by a predetermined light amount so as to set an emission timing and an emission amount for the photographing to the second flash unit 400. Since the optical pulse communication is a known technique, its detailed description is omitted. Thereby, the controller 105 as an optical pulse communication unit can perform the optical pulse communication with the second flash unit 400 by controlling the first flash unit 300 to emit the optical pulse in order to perform flash light emission of the plurality of flash units in the continuous flash photographing.

The controller 105 stops the cyclical obtainment of the live view image by the first image pickup controller so as to thin out the photographing, and performs the optical pulse communication at the non-accumulation timing generated by thinning out the cyclical obtainment of the live view image. After that, the controller 105 proceeds with the process to the step S105.

When the preparation process for the multiple emission from the step S201 to the step S203 is executed in this way, the controller 105 executes the flash photographing while controlling the first flash unit 300 and the second flash unit 400 to perform the pre-emissions for the flash control. Moreover, the controller 105 calculates the emission amounts of the main emissions of the first and second flash units 300 and 400 in the step S111 on the basis of the picked-up image with the pre-emissions obtained in the step S110.

Figure 9:
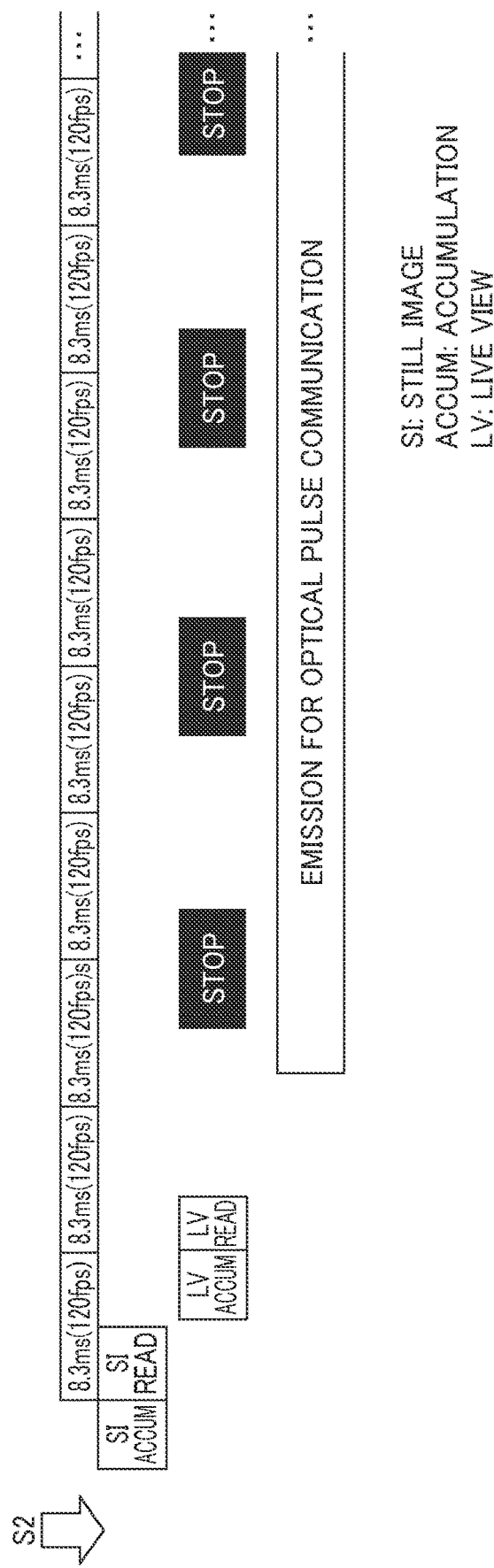
FIG. 9 is a timing chart showing the image pickup process of the flowchart in FIG. 8 in a period when the plurality of flash units execute the optical pulse communication.

FIG. 9 is a timing chart showing the image pickup process of the flowchart in FIG. 8 in the period when the plurality of flash units execute the optical pulse communication. FIG. 9 shows the sequence of the image pickup process in the case where the processes in the steps S202 and S203 in FIG. 8 are executed.

In the sequence of the image pickup process in FIG. 9, the image sensor 103 repeats the flash photographing accompanied with the main emissions of the first flash unit 300 and the second flash unit 400 at a predetermined cycle. Moreover, the image sensor 103 tries to repeat the pickup of a live view image at the cycle of 60 fps suitable for update of a live view image. However, the photographing from the second live view image is temporarily stopped through the process in the step S202 and second and later live view images lack. Then, the controller 105 executes the optical pulse communication between the first flash unit 300 and the second flash unit 400 in the period in which the photographing of the live view image is stopped.

In this embodiment, the controller 105 as the optical pulse communication unit can perform the optical pulse communication with the second flash unit 400 by controlling the first flash unit 300 to emit the optical pulse in order to perform flash light emission of the plurality of flash units in the continuous flash photographing. Moreover, when executing the optical pulse communication, the controller 105 stops the cyclic obtainment of a live view image by the first image pickup controller so as to thin out. Then, the controller 105 performs the optical pulse communication at a non-accumulation timing generated by thinning out the cyclic obtainment of the live view image.

Accordingly, in this embodiment, the image pickup apparatus 1 can update the live view image at the cycle suitable for the live view while reducing lacks. Moreover, since the live view image is not subjected to the influence of the optical pulse for performing the optical pulse communication between the flash units, the certain stable image quality can be obtained. The user can determine the image pickup area suitably on the basis of the live view image having the stable image quality.

Figure 10:
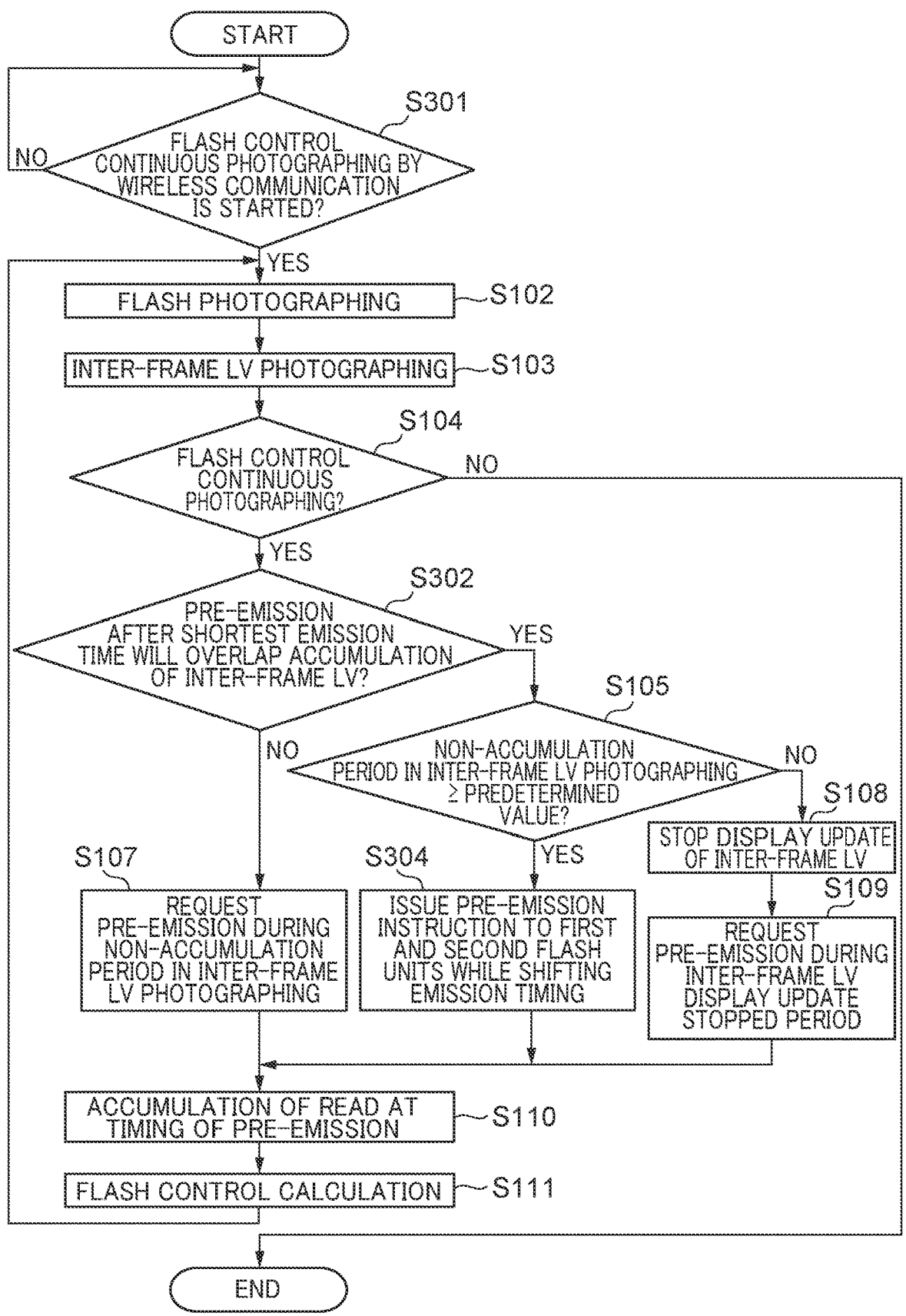
FIG. 10 is a flowchart showing an image pickup process executed in the image pickup apparatus in FIG. 1 in a case where the plurality of flash units execute wireless communication and an external flash unit performs pre-emission for flash control for the continuous flash photographing.

Next, an example that executes the continuous flash photographing accompanied with the wireless communication between a plurality of flash units and the pre-emissions for flash control will be described. FIG. 10 is a flowchart showing an image pickup process executed in the image pickup apparatus 1 in FIG. 1 in a case where the plurality of flash units execute wireless communication and an external flash unit performs pre-emission for flash control for the continuous flash photographing. Each of the first flash unit 300 and the second flash unit 400 in FIG. 1 has a wireless communication unit in order to execute the wireless communication. It should be noted that only the wireless communication unit 306 of the first flash unit 300 is shown and the wireless communication unit of the second flash unit 400 is omitted in FIG. 1.

The controller 105 of the image pickup apparatus 1 executes the process in FIG. 10 when a plurality of flash units execute the wireless communication and the continuous flash photographing accompanied with pre-emission for flash control is executed. The steps S102 through S111 are the same as that in FIG. 6, and their descriptions are omitted.

In a step S301, the controller 105 determines whether the continuous photographing accompanied with the flash control by the wireless communication with a plurality of flash units is started. When starting the continuous photographing accompanied with the flash control by the wireless communication with the flash units, a user gives a start operation to the operation unit 122. When the predetermined start operation is not given to the operation unit 122, the controller 105 repeats this process. When the predetermined start operation is given to the operation unit 122, the controller 105 proceeds with the process to the step S102. After that, the controller 105 executes the processes from the step S102 to the step S104. When it is determined that the termination operation is not given to the operation unit 122 in the step S104, the controller 105 proceeds with the process to a step S302.

In the step S302, the controller 105 determines whether at least one of the pre-emissions will overlap the charge accumulation of the image sensor 103 for the live view image when the first flash unit 300 and second flash unit 400 are controlled to perform the pre-emissions at the shortest emission time. Thereby, the controller 105 as the second image pickup controller can determine whether the pre-emission of at least one of the first light emission member 302 and second light emission member 401 at the shortest emission time will overlap the charge accumulation of the image sensor 103 for the live view image.

When neither of the pre-emissions will overlap the charge accumulation of the image sensor 103 for the live view image, the controller 105 proceeds with the process to the step S107. In this case, the controller 105 requests the pre-emission for the flash control from the first flash unit 300 in the step S107. Moreover, the controller 105 executes the wireless communication between the first flash unit 300 and second flash unit 400 so as to request the pre-emission for the flash control from the second flash unit 400. After that, the controller 105 proceeds with the process to the step S110 and executes the flash photographing with the pre-emissions of the first flash unit 300 and second flash unit 400.

In the meantime, when it is determined that at least one of the pre-emissions will overlap the charge accumulation of the image sensor 103 for the live view image in the step S302, the controller 105 proceeds with the process to the step S105. In the step S105, the controller 105 determines whether a non-accumulation (blank) period in the inter-frame live view until the next live view image is picked up is equal to or more than the predetermined value. In this way, the controller 105 as the second image pickup controller first determines whether the pre-emission of the first flash unit 300 or the pre-emission of the second flash unit 400 at the shortest emission time will overlap the charge accumulation of the image sensor 103 for the live view image.

Moreover, the controller 105 determines whether the non-accumulation period between the cyclic charge accumulations of the image sensor 103 for the live view images is equal to or more than the accumulation period of the image sensor 103 for the flash control image. Then, when the non-accumulation (blank) period is less than the predetermined value, the controller 105 proceeds with the process to the step S108. In this case, the controller 105 temporarily stops the display update of the inter-frame live view image in the step S108.

Moreover, the controller 105 requests the pre-emission for the flash control from the first flash unit 300 in the step S109. Moreover, the controller 105 executes the wireless communication between the first flash unit 300 and the second flash unit 400 so as to request the pre-emission for the flash control from the second flash unit 400. After that, the controller 105 proceeds with the process to the step S110 and executes the flash photographing with the pre-emissions of the first flash unit 300 and second flash unit 400.

In the meantime, when the non-accumulation (blank) period is equal to or more than the predetermined value, the controller 105 proceeds with the process to a step S304. In the step S304, the controller 105 requests the pre-emission for the flash control from the first flash unit 300. Moreover, the controller 105 executes the wireless communication between the first flash unit 300 and the second flash unit 400 so as to request the pre-emission for the flash control from the second flash unit 400. At this time, the controller 105 perform shift setting to the second flash unit 400 to delay a light emission timing. After that, the controller 105 proceeds with the process to the step S110 and executes the flash photographing with the pre-emissions of the first flash unit 300 and second flash unit 400.

Figure 11B:
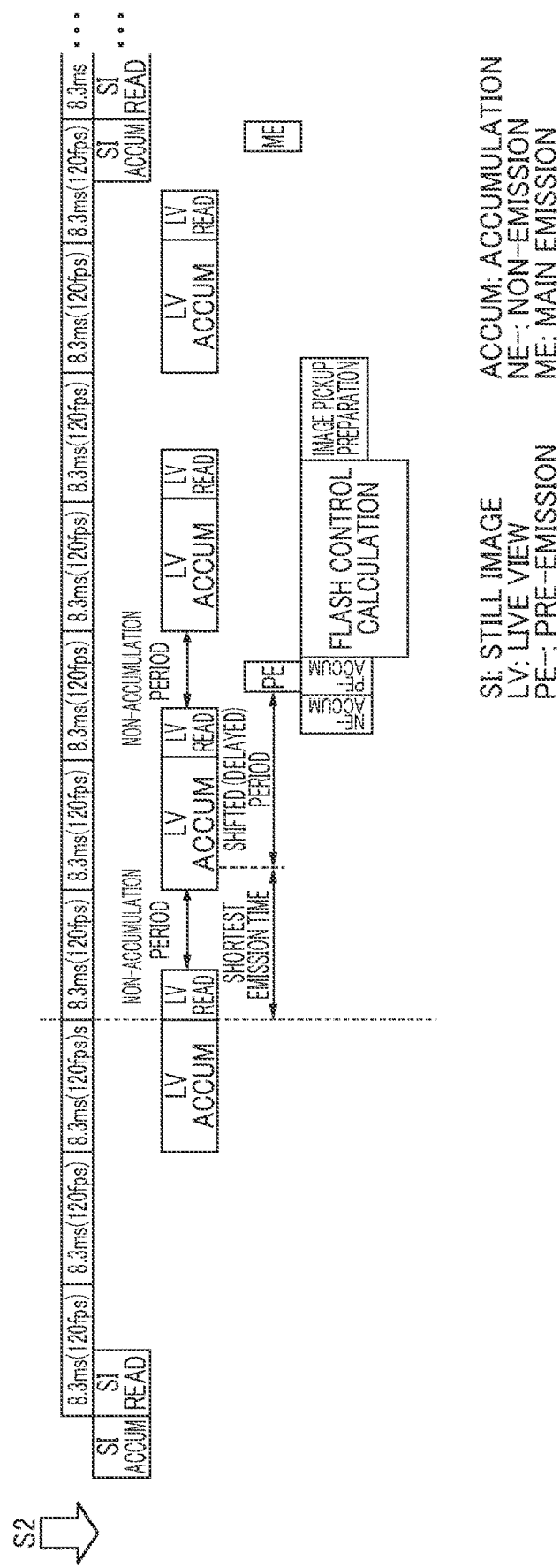
Figure 11C:
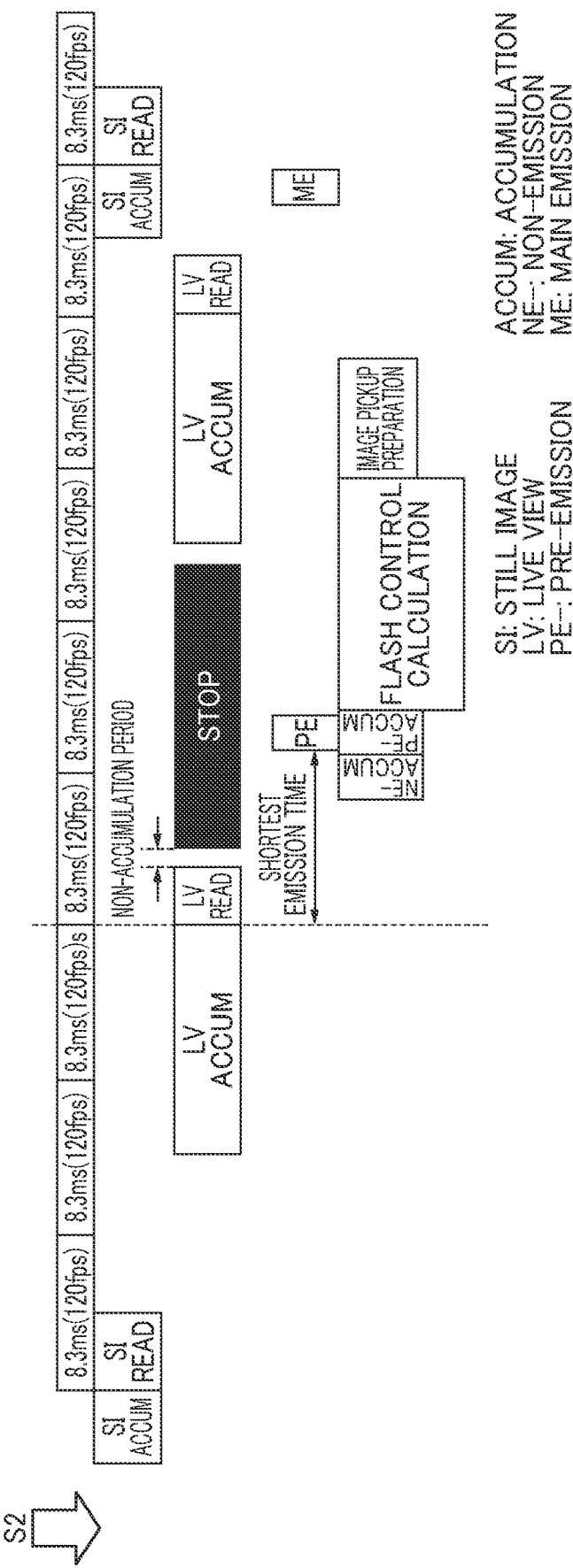

FIG. 11A, FIG. 11B, and FIG. 11C are timing charts showing the image pickup process of the flowchart in FIG. 10 in the case where the external flash unit performs the pre-emission for the flash control for the continuous flash photographing. FIG. 11A shows the sequence of the image pickup process in a case where the process in the step S107 is executed because the pre-emission at the shortest emission time will not overlap the charge accumulation for the live view image.

In the sequence of the image pickup process in FIG. 11A, the image sensor 103 repeats the flash photographing accompanied with the main emissions of the first flash unit 300 and second flash unit 400 at a predetermined cycle. Moreover, the image sensor 103 repeatedly picks up a live view image at the cycle of 60 fps suitable for update of the live view image without a lack.

Then, the image sensor 103 performs the photographing (accumulation) accompanied with the pre-emissions of the first flash unit 300 and second flash unit 400 at a non-accumulation (blank) timing between the image pickup timings of the first two continuous live view images at the shortest emission time. In this way, when the pre-emission of the first flash unit 300 and the pre-emission of the second flash unit 400 at the shortest emission time will not overlap the charge accumulation of the image sensor 103 for the live view image, the controller 105 executes wireless communication and executes the pre-emissions of the first flash unit 300 and second flash unit 400 at the shortest emission time. It should be noted that the above-mentioned process is also applied to a case where the pre-emission is performed by the second flash unit 400 only.

FIG. 11B shows the sequence of the image pickup process in a case where the process in the step S304 is executed. That is, FIG. 11B shows the case where the pre-emission at the shortest emission time will overlap the charge accumulation for the live view image because the accumulation period for the live view image becomes longer than that in the case in FIG. 11A and where the non-accumulation period is equal to or more than the predetermined value. In the sequence of the image pickup process in FIG. 11B, the image sensor 103 repeats the flash photographing accompanied with the main emissions of the first flash unit 300 and second flash unit 400 at a predetermined cycle. Moreover, the image sensor 103 repeatedly picks up a live view image at the cycle of 60 fps suitable for update of a live view image without a lack. Then, the image sensor 103 delays the timing of the photographing (accumulation) accompanied with the pre-emissions of the first flash unit 300 and second flash unit 400 by the shifted (delayed) period from the shortest emission time. And the image sensor 103 performs the photographing accompanied with the pre-emissions during the non-accumulation (blank) period of the live view image.

In this way, when the pre-emission of the first flash unit 300 and the pre-emission of the second flash unit 400 at the shortest emission time will overlap the charge accumulation for the live view image and when the non-accumulation period is equal to or more than the accumulation period of the electric charge of the image sensor 103 for the flash control image, the controller 105 executes wireless communication and performs the pre-emissions at the timing delayed from the shortest emission time. The controller 105 at least controls the second flash unit 400 so as to perform the pre-emission at the non-accumulation timing that is delayed from the shortest emission time. It should be noted that the above-mentioned process is also applied to a case where the pre-emission is performed by the second flash unit 400 only.

FIG. 11C shows the sequence of the image pickup process in a case where the processes in the steps S108 and S109 are executed. That is, FIG. 11C shows the case where the pre-emission at the shortest emission time will overlap the charge accumulation for the live view image because the accumulation period for the live view image becomes longer than that in the case in FIG. 11B and where the non-accumulation period is less than the predetermined value. In the sequence of the image pickup process in FIG. 11C, the image sensor 103 repeats the flash photographing accompanied with the main emission of the first flash unit 300 at a predetermined cycle. Moreover, the image sensor 103 tries to repeat the pickup of a live view image at the cycle of 60 fps suitable for update of a live view image. However, the photographing of the second live view image is temporarily stopped through the process in the step S108 and the second live view image lacks.

Then, the image sensor 103 executes the photographing (accumulation) accompanied with the pre-emissions of the first flash unit 300 and second flash unit 400 during the period in which the photographing of the live view image is stopped. In this way, when the pre-emission of the first flash unit 300 and the pre-emission of the second flash unit 400 at the shortest emission time will overlap the charge accumulation of the image sensor 103 for the live view image and when the non-accumulation period is less than the predetermined value, the controller 105 executes the wireless communication and performs the pre-emissions at the timing delayed from the shortest emission time.

When the non-accumulation period is less than the accumulation period of the electric charge of the image sensor 103 for the flash control image, the controller 105 stops the cyclic obtainment of the live view image by the first image pickup controller so as to thin out. Then, the controller 105 at least performs the pre-emission of the second flash unit 400 at a non-accumulation timing that is generated by thinning out the cyclic obtainment of the live view image and that is delayed from the shortest emission time. It should be noted that the above-mentioned process is also applied to a case where the pre-emission is performed by the second flash unit 400 only.

Figure 12:
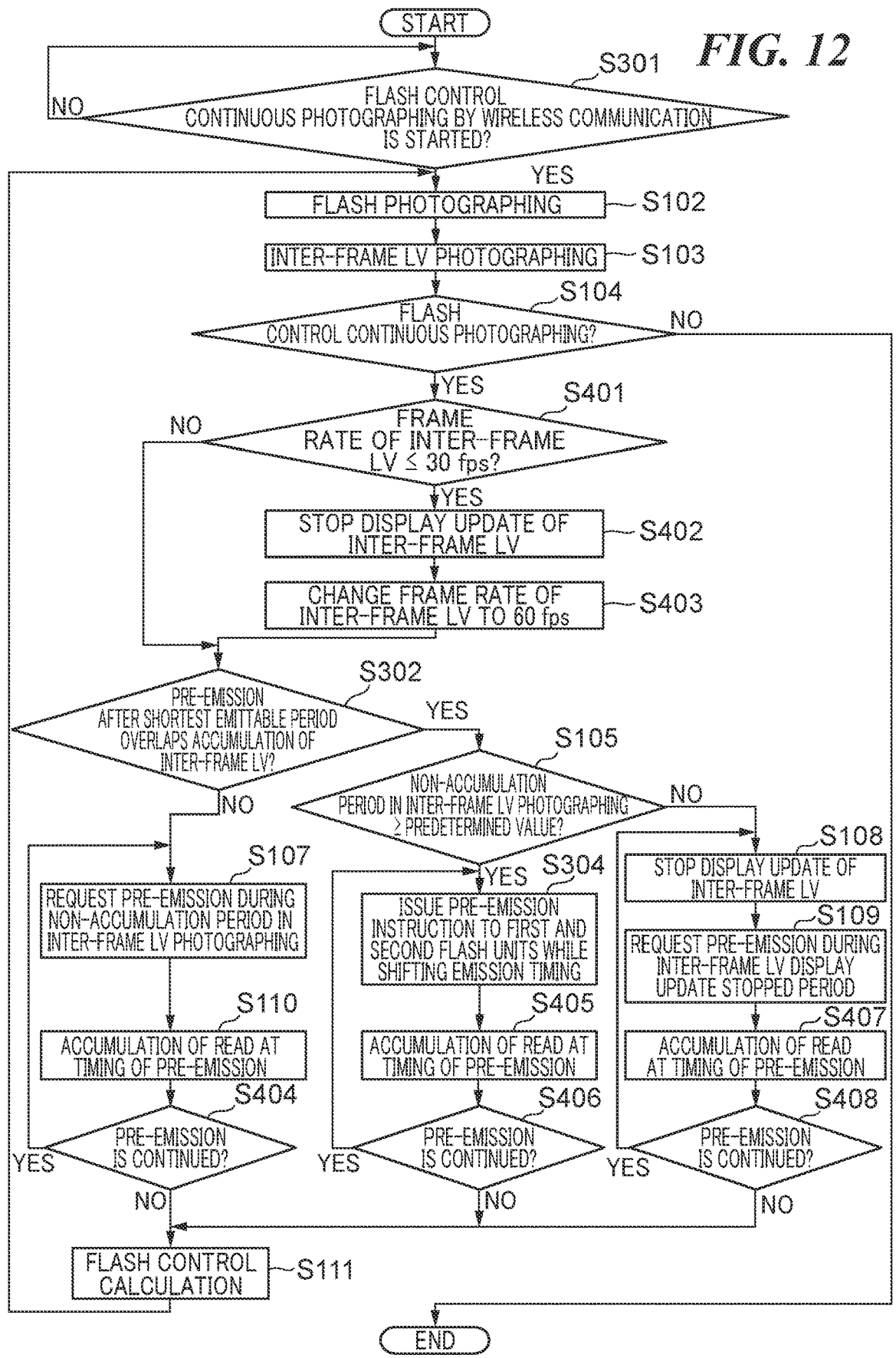
FIG. 12 is a flowchart showing an image pickup process executed in the image pickup apparatus in FIG. 1 in a case where the plurality of flash units execute wireless communication and the plurality of flash units sequentially perform pre-emissions for flash control for the continuous flash photographing.

Next, an example that optimizes the cycle of the live view image and executes the continuous flash photographing accompanied with the wireless communication of a plurality of flash units and the pre-emission for flash control will be described. FIG. 12 is a flowchart showing an image pickup process executed in the image pickup apparatus 1 in FIG. 1 in a case where the plurality of flash units execute wireless communication and the flash units sequentially perform pre-emissions for flash control for the continuous flash photographing.

Each of the first flash unit 300 and the second flash unit 400 in FIG. 1 has a wireless communication unit in order to execute the wireless communication. It should be noted that only the wireless communication unit 306 of the first flash unit 300 is shown and the wireless communication unit of the second flash unit 400 is omitted in FIG. 1.

The controller 105 of the image pickup apparatus 1 executes the process in FIG. 12 when a plurality of flash units execute the wireless communication and when the continuous flash photographing is executed while the flash units sequentially perform pre-emissions for flash control. The steps S102 through S111 and the steps S301 through S304 are the same as that in FIG. 10, and their descriptions are omitted. The controller 105 executes the processes in the steps S301, S102 through S104. When it is determined that the termination operation is not given to the operation unit 122 in the step S104, the controller 105 proceeds with the process to a step S401.

In the step S401, the controller 105 determines whether a current frame rate of the live view image is equal to or less than a low frame rate of 30 fps. In this way, the controller 105 as a cycle controller can determine the cycle at which the first image pickup controller cyclically obtains the live view image using the image sensor 103. Then, when the current frame rate of the live view image is equal to or less than 30 fps, the controller 105 proceeds with the process to a step S402. When the current frame rate of the live view image is more than 30 fps (for example, 60 fps), the controller 105 skips the processes in the step S402 and a step S403, and proceeds with the process to the step S302.

In the step S402, the controller 105 temporarily stops the display update of the live view image as with the step S108. The controller 105 temporarily stops the display update of the live view until the wireless communication between the first flash unit 300 and the second flash unit 400 and the pre-emission of the first flash unit 300 and the pre-emission of the second flash unit 400 have been executed. When a pre-emission is performed, the light of the pre-emission may affect the image quality of the live view image. In the embodiment, since the display update of the inter-frame live view image is temporarily stopped, the light of the pre-emission does not affect the live view image displayed. The controller 105 resumes the display update of the inter-frame live view image in the step S103 after a temporary stop period elapses.

In the step S403, the controller 105 changes into 60 fps the frame rate that is an update cycle of the live view image. After that, the controller 105 proceeds with the process to the step S302. In the step S302, when the controller 105 determines that either of the pre-emissions will overlap the charge accumulation of the image sensor 103 for the live view image when the first flash unit 300 and the second flash unit 400 perform the pre-emissions, the controller 105 executes the processes in the steps S107, S110, and S404. In this case, the controller 105 requests the pre-emission for the flash control at the non-accumulation timing from a non-emission flash unit (i.e., a flash unit that has not yet performed the pre-emission in a current cycle) from among the first flash unit 300 and the second flash unit 400 in the step S107. Moreover, the controller 105 executes the flash photographing accompanied with the pre-emission in the step S110 and proceeds with the process to the step S404.

In the step S404, the controller 105 determines whether the process that controls the flash units to sequentially perform the pre-emissions is continued. When the pre-emission of at least one flash unit is not completed, the controller 105 determines that the process that performs the pre-emissions is continued, and returns the process to the step S107. When the pre-emissions of all the flash units are completed, the controller 105 proceeds with the process to the step S111.

The process in the step S405 is executed in the case where at least one of the pre-emissions will overlap the charge accumulation of the image sensor 103 for the live view image when the first flash unit 300 and second flash unit 400 are controlled to perform the pre-emissions at the shortest emission time (YES in the step S302) and where the non-accumulation (blank) period of the inter-frame live view until the pickup of the next live view image is equal to or more than the predetermined value (YES in the step S105). In this case, the controller 105 requests the pre-emission for the flash control at the non-accumulation from a non-emission flash unit from among the first flash unit 300 and the second flash unit 400 in the step S304. At this time, the controller 105 performs shift setting to the selected flash unit so as to delay the light emission timing.

In the step S405, the controller 105 executes the flash photographing accompanied by the pre-emission of the selected flash unit. In a step S404, the controller 105 determines whether the process that controls the flash units to sequentially perform the pre-emissions is continued. When the pre-emission of at least one flash unit is not completed, the controller 105 determines that the process that performs the pre-emissions is continued, and returns the process to the step S304. When the pre-emissions of all the flash units are completed, the controller 105 proceeds with the process to the step S111.

The process in the step S407 is executed in the case where at least one of the pre-emissions will overlap the charge accumulation of the image sensor 103 for the live view image when the first flash unit 300 and second flash unit 400 are controlled to perform the pre-emissions at the shortest emission time (YES in the step S302) and where the non-accumulation (blank) period of the inter-frame live view until the pickup of the next live view image is less than the predetermined value (NO in the step S105).

In this case, the controller 105 temporarily stops the display update of the live view image in the step S108 and requests the pre-emission for the flash control from a non-emission flash unit from among the first flash unit 300 and the second flash unit 400 in the step S109. Then, in the step S407, the controller 105 executes the flash photographing accompanied with the pre-emission of the selected flash unit.

In a step S408, the controller 105 determines whether the process that controls the flash units to sequentially perform the pre-emissions is continued. When the pre-emission of at least one flash unit is not completed, the controller 105 determines that the process that performs the pre-emissions is continued, and returns the process to the step S108. When the pre-emissions of all the flash units are completed, the controller 105 proceeds with the process to the step S111.

Figure 13:
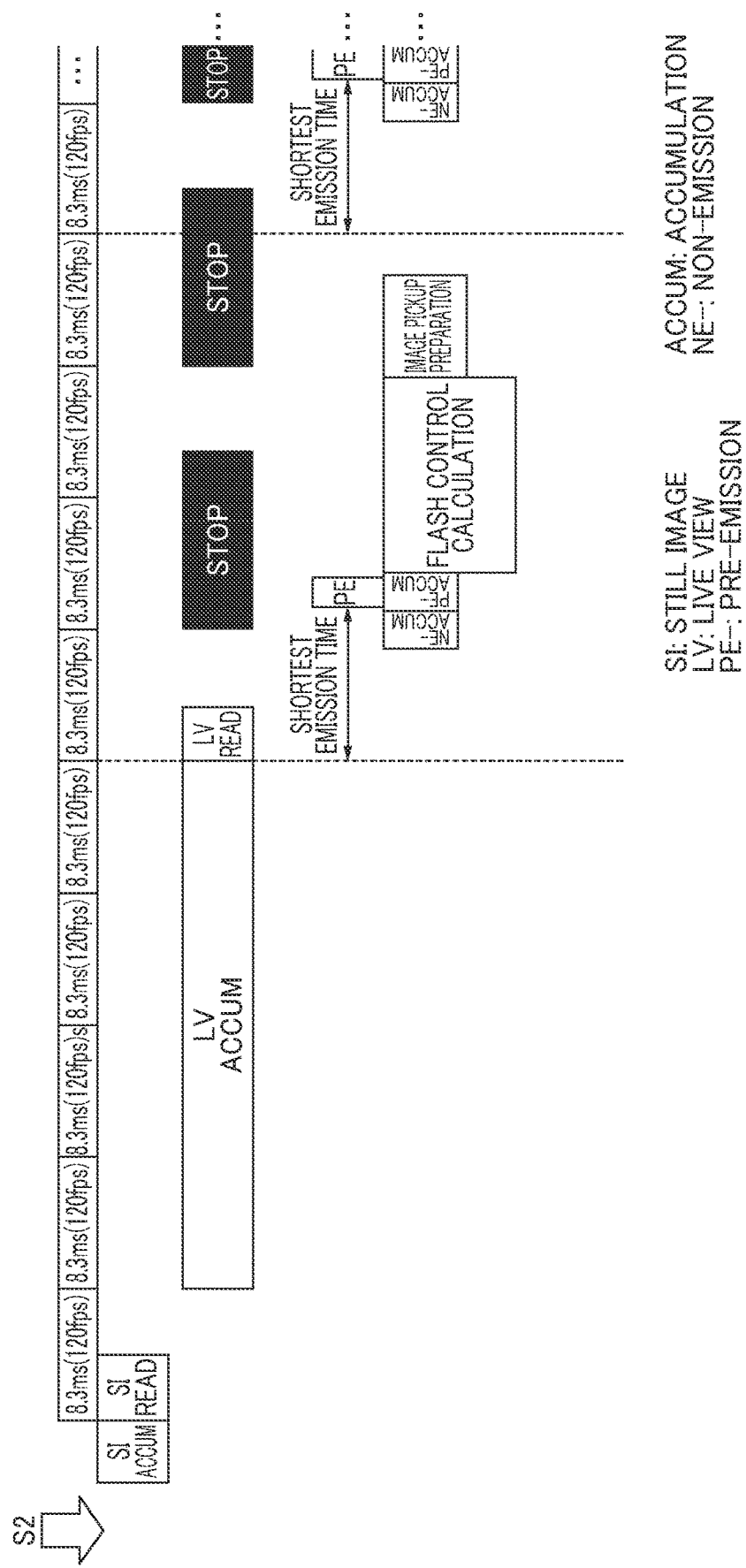
FIG. 13 is a timing chart showing the image pickup process of the flowchart in FIG. 12 in the case where the plurality of flash units sequentially perform pre-emissions for flash control for the continuous flash photographing.

FIG. 13 is a timing chart showing the image pickup process of the flowchart in FIG. 12 in the case where the plurality of flash units sequentially perform pre-emissions for flash control for the continuous flash photographing. FIG. 13 shows the sequence of the image pickup process in the case where the processes in the steps S108 through S408 in FIG. 12 are executed.

In the sequence of the image pickup process in FIG. 13, the image sensor 103 repeats the flash photographing accompanied with the main emission of the first flash unit 300 at a predetermined cycle. Moreover, the image sensor 103 tries to repeat the pickup of a live view image at the cycle of 60 fps suitable for update of a live view image. In the meantime, since the frame rate becomes less than 30 fps and the non-accumulation period is less than the accumulation period of the electric charge of the image sensor 103 for the flash control image because the accumulation period for the live view image is long, the photographing from the second live view image is temporarily stopped as shown in FIG. 13 through the processes in the steps S402 and S108 and second and later live view images lack. Then, the image sensor 103 executes the photographing (accumulation) accompanied with the pre-emission of the first flash unit 300 and the photographing (accumulation) accompanied with the pre-emission of the second flash unit 400 during the period in which the photographing of the live view image is stopped.

In this way, when the pre-emission of the first flash unit 300 and the pre-emission of the second flash unit 400 at the shortest emission time will overlap the charge accumulation for the live view image and when the non-accumulation period is less than the accumulation period of the electric charge of the image sensor 103 for the flash control image, the controller 105 stops the photographing of the live view image and delays the pre-emission timings from the shortest emission time by executing wireless communication. The controller 105 controls the first flash unit 300 and the second flash unit 400 so as to perform the pre-emissions sequentially at the delayed timings from the shortest emission time.

Moreover, when the accumulation period for the live view image becomes long in a case of photographing in a dark place and the frame rate becomes low, the execution of the pre-emission delays in general. In the meantime, in this embodiment, the frame rate of the live view image is compulsorily heightened in the step S403. As a result, in this embodiment, the execution of the pre-emission does not become too late. Accordingly, the process that sequentially performs the pre-emissions of the flash units can be completed promptly. In this way, when the cycle at which the first image pickup controller cyclically obtains the live view image using the image sensor 103 is longer than the predetermined cycle, the controller 105 as the cycle controller stops the cyclic obtainment of the live view image by the first image pickup controller so as to thin out.

Then, the controller 105 can change into a predetermined cycle the cycle at which the first image pickup controller cyclically obtains the live view image using the image sensor 103. Moreover, after the controller 105 changes into the predetermined cycle the cycle of the cyclic obtainment of the live view image using the image sensor 103, the controller 105 can obtain the flash control image accompanied with the pre-emission of the first light emission member 302 for a continuous flash photographing using the image sensor 103.

Although the disclosure has been described in detail on the basis of the suitable embodiments, the disclosure is not limited to these specific embodiments, and various configurations that do not deviate from the scope of the disclosure are also included in the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the disclosure have been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-086107, filed May 21, 2021, which is hereby incorporated by reference herein in its entirety.

What is claimed is:

1. An apparatus comprising:
a sensor;
a memory device that stores a set of instructions; and at least one processor that executes the set of instructions in the memory device to:
obtain a display image cyclically using the sensor;
obtain a flash control image accompanied with a pre-emission of a first flash unit using the sensor at a non-accumulation timing at which the sensor does not perform charge accumulation for cyclic obtainment of the display image;
perform the pre-emission of the first flash unit at the non-accumulation timing in a case where a non-accumulation period between cyclic charge accumulations of the sensor for the display images is not less than an accumulation period of electric charge of the sensor for the flash control image;
stop the cyclic obtainment of the display image so as to thin out in a case where the non-accumulation period between the cyclic charge accumulations of the sensor for the display images is less than the accumulation period of the electric charge of the sensor for the flash control image; and
perform the pre-emission of the first flash unit at a non-accumulation timing generated by thinning out the cyclic obtainment of the display image in a case where the cyclic obtainment of the display image is stopped.

2. The apparatus according to claim 1, wherein the at least one processor executes instructions in the memory device to:
determine whether the pre-emission of at least a second flash unit among the first flash unit and the second flash unit that is wirelessly communicable with the first flash unit, at a shortest emission time will overlap charge accumulation of the sensor for the display image,
perform the wireless communication and the pre-emission of at least the second flash unit among the first flash unit and the second flash unit at the shortest emission time in a case where the pre-emission at the shortest emission time will not overlap the charge accumulation, and
perform the wireless communication and the pre-emission of at least the second flash unit among the first flash unit and the second flash unit at a timing delayed from the shortest emission time in a case where the pre-emission at the shortest emission time will overlap the charge accumulation.

3. The apparatus according to claim 2, wherein the at least one processor executes instructions in the memory device to:
determine whether a non-accumulation period between the cyclic charge accumulations of the sensor for the display images is not less than an accumulation period of the electric charge of the sensor for the flash control image in the case where the pre-emission of at least the second flash unit among the first flash unit and the second flash unit at the shortest emission time will overlap the charge accumulation of the sensor for the display image,
perform the pre-emission of at least the second flash unit among the first flash unit and the second flash unit at a non-accumulation timing delayed from the shortest emission time in a case where the non-accumulation period is not less than the accumulation period of the electric charge of the sensor for the flash control image, and
stop the cyclic obtainment of the display image so as to thin out in a case where the non-accumulation period is less than the accumulation period of the electric charge of the sensor for the flash control image, and
perform the pre-emission of at least the second flash unit among the first flash unit and the second flash unit at a non-accumulation timing generated by thinning out the cyclic obtainment of the display image at a timing delayed from the shortest emission time in a case where the cyclic obtainment of the display image is stopped.

4. The apparatus according to claim 1, wherein the at least one processor executes instructions in the memory device to:
determine the cycle at which the display image is cyclically obtained using the sensor,
stop the cyclic obtainment of the display image so as to thin out in a case where the cycle at which the display image is cyclically obtained using the sensor is longer than a predetermined cycle, and
change into the predetermined cycle the cycle at which the display image is cyclically obtained using the sensor.

5. The apparatus according to claim 4, wherein the at least one processor executes instructions in the memory device to obtain the flash control image accompanied with the pre-emission of the first flash unit after changing into the predetermined cycle the cycle at which the display image is cyclically obtained using the sensor.

6. An apparatus comprising:
a sensor;
a memory device that stores a set of instructions; and
at least one processor that executes the set of instructions in the memory device to:
obtain a display image cyclically using the sensor;
obtain a flash control image accompanied with a pre-emission of a first flash unit using the sensor at a non-accumulation timing at which the sensor does not perform charge accumulation for cyclic obtainment of the display image,
stop the cyclic obtainment of the display image so as to thin out; and
perform communication using an optical pulse with a second flash unit by controlling the first flash unit to emit an optical pulse at a non-accumulation timing generated by stopping and thinning out the cyclical obtainment of the display image.

7. A method for an apparatus that enables emission photographing by a sensor in a state where a first flash unit emits light, the method comprising:
obtaining a display image cyclically using the sensor;
obtaining a flash control image accompanied with a pre-emission of the first flash unit using the sensor at a non-accumulation timing at which the sensor does not perform charge accumulation for cyclic obtainment of the display image;
performing the pre-emission of the first flash unit at the non-accumulation timing in a case where a non-accumulation period between cyclic charge accumulations of the sensor for the display images is not less than an accumulation period of electric charge of the sensor for the flash control image;
stopping the cyclic obtainment of the display image so as to thin out in a case where the non-accumulation period between the cyclic charge accumulations of the sensor for the display images is less than the accumulation period of the electric charge of the sensor for the flash control image; and
performing the pre-emission of the first flash unit at a non-accumulation timing generated by thinning out the cyclic obtainment of the display image in a case where the cyclic obtainment of the display image is stopped.

8. The method according to claim 7, further comprising:
determining whether the pre-emission of at least a second flash unit among the first flash unit and the second flash unit that is wirelessly communicable with the first flash unit, at a shortest emission time will overlap charge accumulation of the sensor for the display image, performing the wireless communication and the pre-emission of at least the second flash unit among the first flash unit and the second flash unit at the shortest emission time in a case where the pre-emission at the shortest emission time will not overlap the charge accumulation, and performing the wireless communication and the pre-emission of at least the second flash unit among the first flash unit and the second flash unit at a timing delayed from the shortest emission time in a case where the pre-emission at the shortest emission time will overlap the charge accumulation.

9. The method according to claim 8, further comprising:
determining whether a non-accumulation period between the cyclic charge accumulations of the sensor for the display images is not less than an accumulation period of the electric charge of the sensor for the flash control image in the case where the pre-emission of at least the second flash unit among the first flash unit and the second flash unit at the shortest emission time will overlap the charge accumulation of the sensor for the display image, performing the pre-emission of at least the second flash unit among the first flash unit and the second flash unit at a non-accumulation timing delayed from the shortest emission time in a case where the non-accumulation period is not less than the accumulation period of the electric charge of the sensor for the flash control image, stopping the cyclic obtainment of the display image so as to thin out in a case where the non-accumulation period is less than the accumulation period of the electric charge of the sensor for the flash control image, and performing the pre-emission of at least the second flash unit among the first flash unit and the second flash unit at a non-accumulation timing generated by thinning out the cyclic obtainment of the display image at a timing delayed from the shortest emission time in a case where the cyclic obtainment of the display image is stopped.

10. The method according to claim 7, further comprising:
determining the cycle at which the display image is cyclically obtained using the sensor,
stopping the cyclic obtainment of the display image so as to thin out in a case where the cycle at which the display image is cyclically obtained using the sensor is longer than a predetermined cycle, and
changing into the predetermined cycle the cycle at which the display image is cyclically obtained using the sensor.

11. The method according to claim 10, further comprising obtaining the flash control image accompanied with the pre-emission of the first flash unit after changing into the predetermined cycle the cycle at which the display image is cyclically obtained using the sensor.

12. A method for an apparatus that enables emission photographing by a sensor in a state where a first flash unit emits light, the method comprising:
obtaining a display image cyclically using the sensor;
obtaining a flash control image accompanied with a pre-emission of the first flash unit using the sensor at a non-accumulation timing at which the sensor does not perform charge accumulation for cyclic obtainment of the display image;
stopping the cyclic obtainment of the display image so as to thin out; and performing communication using an optical pulse with a second flash unit by controlling the first flash unit to emit an optical pulse at a non-accumulation timing generated by stopping and thinning out the cyclical obtainment of the display image.

13. A non-transitory computer-readable storage medium storing a program for causing a computer to execute a method for an apparatus that enables emission photographing by a sensor in a state where a first flash unit emits light, the method comprising:
obtaining a display image cyclically using the sensor;
obtaining a flash control image accompanied with a pre-emission of the first flash unit using the sensor at a non-accumulation timing at which the sensor does not perform charge accumulation for cyclic obtainment of the display image;
performing the pre-emission of the first flash unit at the non-accumulation timing in a case where a non-accumulation period between cyclic charge accumulations of the sensor for the display images is not less than an accumulation period of electric charge of the sensor for the flash control image;
stopping the cyclic obtainment of the display image so as to thin out in a case where the non-accumulation period between the cyclic charge accumulations of the sensor for the display images is less than the accumulation period of the electric charge of the sensor for the flash control image; and
performing the pre-emission of the first flash unit at a non-accumulation timing generated by thinning out the cyclic obtainment of the display image in a case where the cyclic obtainment of the display image is stopped.

14. The storage medium according to claim 13, wherein the method further comprises:
determining whether the pre-emission of at least a second flash unit among the first flash unit and the second flash unit that is wirelessly communicable with the first flash unit, at a shortest emission time will overlap charge accumulation of the sensor for the display image,
performing the wireless communication and the pre-emission of at least the second flash unit among the first flash unit and the second flash unit at the shortest emission time in a case where the pre-emission at the shortest emission time will not overlap the charge accumulation, and
performing the wireless communication and the pre-emission of at least the second flash unit among the first flash unit and the second flash unit at a timing delayed from the shortest emission time in a case where the pre-emission at the shortest emission time will overlap the charge accumulation.

15. The storage medium according to claim 14, wherein the method further comprises:
determining whether a non-accumulation period between the cyclic charge accumulations of the sensor for the display images is not less than an accumulation period of the electric charge of the sensor for the flash control image in the case where the pre-emission of at least the second flash unit among the first flash unit and the second flash unit at the shortest emission time will overlap the charge accumulation of the sensor for the display image,
performing the pre-emission of at least the second flash unit among the first flash unit and the second flash unit at a non-accumulation timing delayed from the shortest emission time in a case where the non-accumulation period is not less than the accumulation period of the electric charge of the sensor for the flash control image, and stopping the cyclic obtainment of the display image so as to thin out in a case where the non-accumulation period is less than the accumulation period of the electric charge of the sensor for the flash control image, and performing the pre-emission of at least the second flash unit among the first flash unit and the second flash unit at a non-accumulation timing generated by thinning out the cyclic obtainment of the display image at a timing delayed from the shortest emission time in a case where the cyclic obtainment of the display image is stopped.

16. The storage medium according to claim 13, wherein the method further comprises:

determining the cycle at which the display image is cyclically obtained using the sensor, stopping the cyclic obtainment of the display image so as to thin out in a case where the cycle at which the display image is cyclically obtained using the sensor is longer than a predetermined cycle, and changing into the predetermined cycle the cycle at which the display image is cyclically obtained using the sensor.

17. A non-transitory computer-readable storage medium storing a program for causing a computer to execute a method for an apparatus that enables emission photographing by a sensor in a state where a first flash unit emits light, the method comprising:

obtaining a display image cyclically using the sensor;

obtaining a flash control image accompanied with a pre-emission of the first flash unit using the sensor at a non-accumulation timing at which the sensor does not perform charge accumulation for cyclic obtainment of the display image;

stopping the cyclic obtainment of the display image so as to thin out; and performing communication using an optical pulse with a second flash unit by controlling the first flash unit to emit an optical pulse at a non-accumulation timing generated by stopping and thinning out the cyclical obtainment of the display image.

* * * * *